(12) United States Patent
Ott et al.

(10) Patent No.: US 6,851,280 B2
(45) Date of Patent: Feb. 8, 2005

(54) METHOD OF MAKING A HALOGEN LAMP AND OTHER ANALOGOUS LAMPS AND OBJECTS, AND APPARATUS FOR THE MANUFACTURE THEREOF

(75) Inventors: Franz Ott, Mitterteich (DE); Otmar Becker, Langen (DE); Karin Naumann, Ober-Olm (DE)

(73) Assignee: Schott Glas, Mainz (DE)

( * ) Notice: Subject to any disclaimer, the term of this patent is extended or adjusted under 35 U.S.C. 154(b) by 254 days.

(21) Appl. No.: 09/823,937

(22) Filed: Mar. 30, 2001

(65) Prior Publication Data

US 2001/0055930 A1 Dec. 27, 2001

(30) Foreign Application Priority Data

Mar. 31, 2000 (DE) .......................................... 100 16 108

(51) Int. Cl.[7] .............................................. C03B 40/00
(52) U.S. Cl. ........................... 65/25.1; 65/29.15; 65/86; 65/90; 65/182.2
(58) Field of Search ............................... 65/25.1, 29.12, 65/29.15, 59.25, 59.26, 59.27, 86–88, 90–101, 138, 139, 153–159, 182.2, 187–206, 374.12

(56) References Cited

U.S. PATENT DOCUMENTS

| 972,614 | A | * | 10/1910 | Frink ........................ 65/29.15 |
|---|---|---|---|---|
| 2,150,017 | A | * | 3/1939 | Barnard ...................... 65/29.15 |
| 3,303,011 | A | * | 2/1967 | Fukuzaki ....................... 65/88 |
| 3,314,772 | A | | 4/1967 | Poole et al. |
| 3,401,028 | A | * | 9/1968 | Morrill, Jr. ................... 65/161 |
| 3,937,623 | A | * | 2/1976 | Kononko et al. ............... 65/88 |
| 4,228,206 | A | | 10/1980 | Fabisak ..................... 428/34.6 |
| 4,319,156 | A | * | 3/1982 | Bienvenue et al. ......... 313/113 |
| 4,717,607 | A | | 1/1988 | Pfizenmaier et al. |
| 5,203,903 | A | * | 4/1993 | Terneu et al. ................ 65/60.2 |
| 5,221,352 | A | * | 6/1993 | Terneu et al. ............... 118/718 |

FOREIGN PATENT DOCUMENTS

| DE | 3426140 | 1/1986 |
|---|---|---|
| DE | 29609958 | 6/1996 |
| EP | 0501562 | 9/1992 |

OTHER PUBLICATIONS

"Packaging of sensitive parenteral drugs in glass containers with a quartz–like surface," in Pharmaceutical Technology Europe, May 1996, vol. 8, No. 5, pp. 22–27.

"Entalkalislerung von $Na_2O$–CaO–$SiO_2$–Glasoberflachen bei Einwirkung chlorhaltiger Gase," H.A. Schaeffer, et al., Glastech, Ber. 54 (1981), No. 8, pp. 247–256.

Kirk–Othmer: "Encyclopedia of chemical technology, third edition, vol. 11" 1978 , John Wiley & Sons, New York, Chichester.Brisbane.Toronto XP00217361 p. 826–827, Table 3.

* cited by examiner

Primary Examiner—Sean Vincent
(74) Attorney, Agent, or Firm—Nils H. Ljungman and Associates

(57) ABSTRACT

The present invention generally relates to a method of making halogen lamps and halogen lamp bulbs, as well as other analogous lamps and objects. The present invention also relates to apparatus used in a method of making halogen lamps and halogen lamp bulbs, as well as other analogous lamps and objects. The method minimizes contamination in the body of the glass and minimizes reaction of lamp halogen with the interior of a halogen lamp.

19 Claims, 5 Drawing Sheets

METHOD OF MAKING A HALOGEN LAMP AND OTHER ANALOGOUS LAMPS AND OBJECTS, AND APPARATUS FOR THE MANUFACTURE THEREOF

BACKGROUND OF THE INVENTION

1. Field of the Invention

The present invention generally relates to a method of making halogen lamps and halogen lamp bulbs, as well as other analogous lamps and objects. The present invention also relates to apparatus used in a method of making halogen lamps and halogen lamp bulbs, as well as other analogous lamps and objects.

2. Background Information

During the operation of a halogen lamp, an equilibrium is established between the formation and decay of tungsten halides from the tungsten vapor from the filament and the mixture of halogen and inert glass. The decay reaction thereby takes place at higher temperatures than the formation reaction, so that the tungsten is re-deposited on the filament. If this cycle is disrupted by contaminating components, the tungsten, instead of being deposited on the filament, is deposited on the inside of the glass bulb as a reflective black coating, and the lamp becomes unusable.

Darkening or blackening in tungsten-halogen lamps occurs because as a result of reactions of the halogen gas with the glass, the amount of halogen gas that must be present to maintain the halogen cycle is reduced to the extent that the halogen cycle collapses and tungsten is deposited as a black coating on the inside of the glass instead of on the filament.

For numerous uses of glass objects, in particular glass tubes or flat glass plates as well as of the shaped bodies formed from the (semi-finished) glass objects, the glass is required to have certain characteristics, in particular of certain surface characteristics, such as for example a high chemical resistance, for example.

Some glass objects that require the specified surface characteristics are listed by way of example in the following list:

for lighting purposes, e.g. halogen lamps,
for discharge lamps,
for the construction of chemical plants,
in flow meters for chemically aggressive media,
for analytical purposes (e.g. test tubes, titration cylinders etc.)
for reagent bottles for special purposes,
for coating measuring electrodes in aggressive media,
for use as components for biotech reactors
containers for medical purposes (e.g. ampoules, bottles, injection bottles, cylinder ampoules etc.),
as primary packaging for pharmaceutical products,
as components for display applications.

Of course the prior art describes glass objects, in particular glass objects made of silica glass (quartz glass, $SiO_2$ glass), as semi-finished products for the forming of hollow molded articles which have, among other things, high chemical resistance. However, such glass objects, are very complex and expensive to produce on account of the high melting point of the $SiO_2$ glass. They can also be produced only with limited optical qualities and are less suited for use as mass produced items. Such glass objects can also be transformed only with very special equipment, because on one hand the transformation temperatures are very high, and on the other hand the temperature range in which transformations are possible is very narrow.

Therefore semi-finished glass objects made of silica glass cannot be produced with sufficient quality and economy for mass-production applications.

Therefore glass with a lower melting point is generally used for products manufactured on an industrial scale, such as borosilicate glass or soda-lime glass. These types of glass can be manufactured and transformed easily.

The prior art also discloses methods that modify in particular the surfaces of glass objects made of glass that has a low melting point.

For example, the prior art described hot forming methods for the production of glass objects from glass melts in which the surfaces of the glass objects are exposed at least partly during the hot forming to a specified gas atmosphere, and the surface characteristics of the glass can thereby be modified in a controlled manner.

U.S. Pat. No. 4,717,607 describes a method for the manufacture of glass tubes in which the glass surface is chemically leached and thereby modified. During the drawing of the glass tube, the inner surface of the glass tube is thereby exposed to a gas mixture of a organo-fluoride gas, e.g. 1,1-difluoroethane, and an oxidizing gas, e.g. air. The fluorine released by combustion of the gas mixture reacts with the alkali and alkaline earth metal ions in the glass surface, forming alkali and alkaline earth compounds that are then exhausted out through the gas tube.

The prior art also describes methods in which the surface of the glass is chemically leached by introducing into the still hot glass tube an appropriately aggressive gas, typically $SO_2$ or HCl gas, which leads to surface reactions and a reduction of the alkali content in the surface.

Such dealkalization methods are described, for example, in H. A. Schaeffer et al., Glastech.Ber. 54 (1981), No. 8, pp. 247–256. The disadvantage of all these methods is that most of the gases used are toxic, whereby the glass surface can still contain traces of these aggressive reagent gases after the chemical treatment, and the surface structure of the glass can be damaged, which results in a rough surface and the presence of active centers on the surface. The use of such aggressive gases is also undesirable from the point of view of compliance with environmental and occupational health and safety requirements. During the transformation of such leached glass tubes, particles can come detached from the porous, damaged surfaces. Moreover, prior to the use of the leached glass tubes, a washing process is necessary to remove the reaction products. This washing process requires a subsequent drying and disposal of the reaction products, i.e. it increases the costs for the production of the semi-finished glass tubes.

U.S. Pat. No. 3,314,772 discloses another method for the removal of alkaline elements from glass with a low melting point by fluoridation using compounds that contain fluorine, e.g. aqueous HF solutions, which has the same typical disadvantages as the other dealkalization methods described above.

To eliminate the disadvantages of the dealkalization methods, the prior art also describes the manufacture of tubular glass containers from glass with a low melting point that are used in particular as packaging for pharmaceutical materials, and are provided on their inner surface with a silicon dioxide ($SiO_2$) coating that makes it as inert as a quartz glass surface (M. Walther, "Packaging of sensitive parenteral drugs in glass containers with a quartz-like surface" in Pharmaceutical Technology Europe, May 1996, Vol. 8, No. 5, pp. 22–27.

The coating of the internal surface of the molded glass objects is thereby done by chemical precipitation of the oxide coating material from its gas phase, in particular by means of a vacuum-assisted plasma CVD method (PECVD= Plasma Enhanced Chemical Vapor Deposition), in particular (DE 296 09 958 U1) and a pulsed plasma (PICVD=Plasma Impulse Chemical Vapor Deposition).

For this purpose, the finish-molded containers, i.e. the formed glass objects themselves, are coated internally. To do that, each formed glass container must be individually subjected to a complex, time-consuming and expensive coating process appropriate to its shape.

OBJECT OF THE INVENTION

The object of the invention is therefore to produce glass objects from a glass melt, the surface of which objects is modified and improved during the hot forming at least partly by means of a gas atmosphere and the surface quality/degree of oxidation can thereby be set and regulated in a controlled manner.

SUMMARY OF THE INVENTION

The invention teaches that this object can be accomplished with a hot forming method for the production of a glass object from a glass melt, whereby the surface of the glass melt is at least partly exposed to a specified gas atmosphere during the hot forming, whereby a gas atmosphere with an oxygen concentration that can be set and regulated is used, and the surface condition of the glass object is thereby modified by means of the set and regulated oxygen content of the gas atmosphere. The surface coating is not produced by the precipitation of components.

With regard to the apparatus, the invention teaches that the device for the hot forming of a glass object from a glass melt, whereby the surface of the glass object is exposed at least partly to a gas atmosphere during the hot forming, has the following means:

Means for the hot forming of the glass object from a glass melt,

Means to produce the gas atmosphere,

Means to set and regulate a specified oxygen content in the gas atmosphere, and

Means to guide the gas atmosphere at least partly along at least one surface of the glass body.

Because, in the hot forming method claimed by the invention, the surface of the glass body is at least partly exposed during the hot forming to a specified gas atmosphere with a set and regulated oxygen concentration, the portion of the surface of the glass body that is exposed to the gas atmosphere can be modified, and thus the surface characteristics or the surface condition can be set as required. In this manner, it is possible using simple means to directly modify and improve the surface of a glass object during the hot forming. The surface of the glass object, depending on the oxygen content in the gas atmosphere, thereby has a specific surface condition and thus a certain surface characteristic that can essentially be regulated and set by means of the oxygen concentration. In addition to the oxygen content of the gas atmosphere, the composition of the respective glass and the processing conditions during the manufacture of the glass object, such as temperature, time and gas pressure, also play an essential role.

The oxygen content of the gas atmosphere is set and regulated in a range of 0 to 100 vol. % and within the range percentages in tenth of percent steps such that any tenth of a percent may be a limit of a diminished range, preferably in a range from 0 to 80 vol. % and within the range percentages in tenth of percent steps such that any tenth of a percent may be a limit of a diminished range, and particularly preferably in a range from 10 to 30 vol. %, and within the range percentages in tenth of percent steps such that any tenth of a percent may be a limit of a diminished range.

The invention further teaches that it is advantageous if a gas atmosphere is used that, in addition to oxygen, contains additional cases, in particular nitrogen, inert gases, $CO_2$, $SO_2$ and/or $H_2O$ (wet or dry atmosphere), the concentration of which is also set and regulated. The gas atmosphere preferably contains essentially nitrogen in addition to oxygen.

The surface condition is thereby preferably modified and set to a surface depth of the glass object of 2000 nm, in particular 1000 nm.

The hot forming method and/or the device claimed by the invention are particularly suited for the production of glass objects in which the glass object is drawn from a glass melt. The glass object in question is preferably a glass tube or flat glass that is drawn from a glass melt, whereby in particular the inner surface of the glass tube is exposed to the gas atmosphere during the tube drawing and is thereby modified. The flat glass can thereby be drawn preferably vertically or horizontally.

The glass objects, in particular glass tubes, are formed and manufactured at processing temperatures and viscosities that are typical for the respective glass composition, in particular viscosities in the range of $10^4$ to $10^5$ dPas.

In particular glass objects that are formed from a hot glass melt at a temperature of more than 1000° C., preferably above 1200° C., can be advantageously produced with the method and/or with the device claimed by the invention.

It has been determined, for example, that glass objects as claimed by the invention can be manufactured and hot formed from a borosilicate, neutral or aluminosilicate glass melt, whereby the surface can be advantageously improved and modified by means of the oxygen concentration.

The preferred glass melt is an aluminosilicate glass melt having the following composition (in wt. % on an oxide basis): $SiO_2$ 40–75 and within the range percentages in tenth of percent steps such that any tenth of a percent may be a limit of a diminished range, $Al_2O_3$ 10–27 and within the range percentages in tenth of percent steps such that any tenth of a percent may be a limit of a diminished range, $B_2O_3$ 0–15 and within the range percentages in tenth of percent steps such that any tenth of a percent may be a limit of a diminished range, MgO 0–10 and within the range percentages in tenth of percent steps such that any tenth of a percent may be a limit of a diminished range, CaO 0–12 and within the range percentages in tenth of percent steps such that any tenth of a percent may be a limit of a diminished range, SrO 0–12 and within the range percentages in tenth of percent steps such that any tenth of a percent may be a limit of a diminished range, BaO 0–30 and within the range percentages in tenth of percent steps such that any tenth of a percent may be a limit of a diminished range, ZnO 0–10 and within the range percentages in tenth of percent steps such that any tenth of a percent may be a limit of a diminished range, $ZrO_2$ 0–5 and within the range percentages in tenth of percent steps such that any tenth of a percent may be a limit of a diminished range, $TiO_2$ 0–5.5 and within the range percentages in tenth of percent steps such that any tenth of a percent may be a limit of a diminished range, $P_2O_5$ 0–9 and within the range percentages in tenth of percent steps such that any tenth of a percent may be a limit of a diminished range, which is hot formed and its surface condition set.

It has also been found that aluminosilicate glass melts having the following composition (in wt. % on an oxide basis) are also particular well suited:

$SiO_2$ 46–64 and within the range percentages in tenth of percent steps such that any tenth of a percent may be a limit of a diminished range, $Al_2O_3$ 12–26 and within the range percentages in tenth of percent steps such that any tenth of a percent may be a limit of a diminished range, $B_2O_3$ 0–5.5 and within the range percentages in tenth of percent steps such that any tenth of a percent may be a limit of a diminished range, MgO 0–7 and within the range percentages in tenth of percent steps such that any tenth of a percent may be a limit of a diminished range, CaO 3–14 and within the range percentages in tenth of percent steps such that any tenth of a percent may be a limit of a diminished range, SrO 0–11 and within the range percentages in tenth of percent steps such that any tenth of a percent may be a limit of a diminished range, BaO 6–25 and within the range percentages in tenth of percent steps such that any tenth of a percent may be a limit of a diminished range, $ZrO_2$ 0–5 and within the range percentages in tenth of percent steps such that any tenth of a percent may be a limit of a diminished range, $TiO_2$ 0–0.5 and within the range percentages in tenth of percent steps such that any tenth of a percent may be a limit of a diminished range, and $P_2O_5$ 0–9 and within the range percentages in tenth of percent steps such that any tenth of a percent may be a limit of a diminished range.

$SiO_2$>55–64 and within the range percentages in tenth of percent steps such that any tenth of a percent may be a limit of a diminished range, $Al_2O_3$ 13–18 and within the range percentages in tenth of percent steps such that any tenth of a percent may be a limit of a diminished range, $B_2O_3$ 0–5.5 and within the range percentages in tenth of percent steps such that any tenth of a percent may be a limit of a diminished range, MgO 0–7 and within the range percentages in tenth of percent steps such that any tenth of a percent may be a limit of a diminished range, CaO 5–14 and within the range percentages in tenth of percent steps such that any tenth of a percent may be a limit of a diminished range, SrO 0–8 and within the range percentages in tenth of percent steps such that any tenth of a percent may be a limit of a diminished range, BaO 6–17 and within the range percentages in tenth of percent steps such that any tenth of a percent may be a limit of a diminished range, $ZrO_2$ 0–2 and within the range percentages in tenth of percent steps such that any tenth of a percent may be a limit of a diminished range, and $TiO_2$ 0–0.5 and within the range percentages in tenth of percent steps such that any tenth of a percent may be a limit of a diminished range.

$SiO_2$ 59–62 and within the range percentages in tenth of percent steps such that any tenth of a percent may be a limit of a diminished range, $Al_2O_3$ 13.5–15.5 and within the range percentages in tenth of percent steps such that any tenth of a percent may be a limit of a diminished range, $B_2O_3$ 3–5.5 and within the range percentages in tenth of percent steps such that any tenth of a percent may be a limit of a diminished range, MgO 2.5–5 and within the range percentages in tenth of percent steps such that any tenth of a percent may be a limit of a diminished range, CaO 8.2–10.5 and within the range percentages in tenth of percent steps such that any tenth of a percent may be a limit of a diminished range, BaO 8.5–9.5 and within the range percentages in tenth of percent steps such that any tenth of a percent may be a limit of a diminished range, $ZrO_2$ 0–1.5 and within the range percentages in tenth of percent steps such that any tenth of a percent may be a limit of a diminished range, and $TiO_2$ 0–0.5 and within the range percentages in tenth of percent steps such that any tenth of a percent may be a limit of a diminished range.

$SiO_2$>58–62 and within the range percentages in tenth of percent steps such that any tenth of a percent may be a limit of a diminished range, $Al_2O_3$ 14–17.5 and within the range percentages in tenth of percent steps such that any tenth of a percent may be a limit of a diminished range, $B_2O_3$ 0–1 and within the range percentages in tenth of percent steps such that any tenth of a percent may be a limit of a diminished range, MgO 0–7 and within the range percentages in tenth of percent steps such that any tenth of a percent may be a limit of a diminished range, CaO 5.5–14 and within the range percentages in tenth of percent steps such that any tenth of a percent may be a limit of a diminished range, SrO 0–8 and within the range percentages in tenth of percent steps such that any tenth of a percent may be a limit of a diminished range, BaO 6–17 and within the range percentages in tenth of percent steps such that any tenth of a percent may be a limit of a diminished range, $ZrO_2$ 0–1.5 and within the range percentages in tenth of percent steps such that any tenth of a percent may be a limit of a diminished range, and $TiO_2$ 0–0.5 and within the range percentages in tenth of percent steps such that any tenth of a percent may be a limit of a diminished range.

$SiO_2$>58–62 and within the range percentages in tenth of percent steps such that any tenth of a percent may be a limit of a diminished range, $Al_2O_3$ 15–17.5 and within the range percentages in tenth of percent steps such that any tenth of a percent may be a limit of a diminished range, $B_2O_3$ 0.2–0.7 and within the range percentages in tenth of percent steps such that any tenth of a percent may be a limit of a diminished range, MgO 0–<1 and within the range percentages in tenth of percent steps such that any tenth of a percent may be a limit of a diminished range, CaO 5.5–14 and within the range percentages in tenth of percent steps such that any tenth of a percent may be a limit of a diminished range, SrO 0–8 and within the range percentages in tenth of percent steps such that any tenth of a percent may be a limit of a diminished range, BaO 6–10 and within the range percentages in tenth of percent steps such that any tenth of a percent may be a limit of a diminished range, $ZrO_2$ 0.05–1 and within the range percentages in tenth of percent steps such that any tenth of a percent may be a limit of a diminished range, and $TiO_2$ 0–0.5 and within the range percentages in tenth of percent steps such that any tenth of a percent may be a limit of a diminished range.

$SiO_2$ 46–63 and within the range percentages in tenth of percent steps such that any tenth of a percent may be a limit of a diminished range, $Al_2O_3$ 12–25 and within the range percentages in tenth of percent steps such that any tenth of a percent may be a limit of a diminished range, MgO 0–5 and within the range percentages in tenth of percent steps such that any tenth of a percent may be a limit of a diminished range, CaO 3–14 and within the range percentages in tenth of percent steps such that any tenth of a percent may be a limit of a diminished range, SrO 0–11 and within the range percentages in tenth of percent steps such that any tenth of a percent may be a limit of a diminished range, BaO 6–15 and within the range percentages in tenth of percent steps such that any tenth of a percent may be a limit of a diminished range, with MgO+CaO+SrO+BaO$\leq$25 and within the range percentages in tenth of percent steps such that any tenth of a percent may be a limit of a diminished range, with SrO+BaO$\geq$10 and within the range percentages in tenth of percent steps such that any tenth of a percent may be a limit of a diminished range, $ZrO_2$ 0.1–5 and within the range percentages in tenth of percent steps such that any tenth of a percent may be a limit of a diminished range, and $P_2O_5$ 0.1–9 and within the range percentages in tenth of percent steps such that any tenth of a percent may be a limit of a diminished range.

Suitable borosilicate or neutral glass melts are in the composition range (in wt. % on an oxide basis):

$SiO_2$ 60–80 and within the range percentages in tenth of percent steps such that any tenth of a percent may be a limit of a diminished range, $Al_2O_3$ 2–10 and within the range percentages in tenth of percent steps such that any tenth of a percent may be a limit of a diminished range, $B_2O_3$ 5–20 and within the range percentages in tenth of percent steps such that any tenth of a percent may be a limit of a diminished range, MgO 0–8 and within the range percentages in tenth of percent steps such that any tenth of a percent may be a limit of a diminished range, CaO 0–12 and within the range percentages in tenth of percent steps such that any tenth of a percent may be a limit of a diminished range, SrO 0–8 and within the range percentages in tenth of percent steps such that any tenth of a percent may be a limit of a diminished range, BaO 0–12 and within the range percentages in tenth of percent steps such that any tenth of a percent may be a limit of a diminished range, ZnO 0–10 and within the range percentages in tenth of percent steps such that any tenth of a percent may be a limit of a diminished range, $ZrO_2$ 0–5 and within the range percentages in tenth of percent steps such that any tenth of a percent may be a limit of a diminished range, and $Li_2O+Na_2O+K_2O$ 2–12 and within the range percentages in tenth of percent steps such that any tenth of a percent may be a limit of a diminished range.

The glass melts can also contain known fining agents, e.g. $Sb_2O_3$, $SnO_2$, $MoO_3$, sulfate, $As_2O_3$ as well as coloring components, in particular $Fe_2O_3$ (preferably 0.02 to 0.2 wt. % and within the range percentages in tenth of percent steps such that any tenth of a percent may be a limit of a diminished range) in the usual amounts.

In particular at very high processing temperatures of the glass melt and/or a high oxygen content in the gas atmosphere, it is important to bear in mind that the means to guide the gas atmosphere must be able to withstand a temperature of more than 1200° C., and in particular of more than 1400° C. It has thereby been found to be appropriate if the means for the hot forming of the glass object and/or the means to guide the gas atmosphere are coated or made of platinum or an alloy that contains platinum or other refractory metals or alloys of such metals, in particular in areas that are exposed to high temperatures.

The device claimed by the invention is preferably part of a drawing plant, in particular a part of a tube drawing plant or part of a flat glass drawing plant.

The method claimed by the invention can be applied to all tube drawing methods that use a drawing nozzle that is used in or assists the forming of the glass object, in particular for forming of the tubular cavity. The tube drawing methods in question are well-known and reliable, and the most common such method is described briefly below:

In the Danner process, the drawing nozzle is a slightly inclined, slowly rotating ceramic mandrel, the Danner pipe, onto which a continuous stream of glass melt is poured. On the lower end of the pipe, the gobbing end of the feeder, the glass is drawn off, whereby the introduction of a gas, in particular air, through the hollow shaft of the pipe causes the formation of a drawing root. The horizontally drawn glass tube runs along a roller line to the drawing machine, after which the continuous strand is cut into tubular segments.

A device of the type described above for drawing tubes using the Danner process also has a nozzle from which the glass runs out of the feed trough onto the pipe. The device also has a furnace, for example a gas-heated muffle furnace, to set a temperature gradient between the exit from the nozzle and the pipe end, as well as a blower to pressurize the interior of the glass tube being drawn off with an overpressure or an underpressure with respect to the ambient pressure.

In the Vello process, the glass melt flows out of the furnace forehearth already in tubular form, because it exits through a ring-shaped orifice. The melt flows over a mandrel, the Vello needle, which represents the drawing nozzle of this process. The glass is formed into the tube on the needle. Here, too, air is blown through the hollow needle to obtain a spectrum of different tube dimensions. The tube initially flows vertically downward, is then turned to the horizontal and, as in the Danner Process, is then drawn off via a roller train, cooled and cut to length.

In the down-draw process, the glass melt already flows in tubular form from the furnace forehearth, because it exits through a ring-shaped orifice. It flows over the drawing nozzle, a mandrel, which in this case is called the down-draw needle, where the glass is formed into the tube. This process can also use a gas. The tube is drawn down vertically, and is cut into tube segments without being turned at temperatures of approximately 300° C.

The glass objects manufactured as taught by the invention are preferably used for the manufacture of lamp bulbs, in particular for the manufacture of heavy-duty halogen lamp bulbs, and for the manufacture of containers, in particular of primary packaging for pharmaceuticals.

In addition to the dealkalization method, the prior art also includes methods in which a thin coating is applied to the surface of the glass during the hot forming of a glass object from the glass melt. EP 0 501 562 A1 describes a method for the manufacture of glass tubing, whereby the inner surface of the glass is exposed to a gas atmosphere during drawing. The gas atmosphere thereby consists of a reactive gas or a reactive gas mixture which, in the cooled area of the glass tube, is excited by means of the generation of a plasma and thus produces a surface coating. The coatings used, in particular $SiO_2$ coatings, do not contain alkaline elements or alkaline earth elements.

The above-discussed embodiments of the present invention will be described further hereinbelow. When the word "invention" is used in this specification, the word "invention" includes "inventions", that is the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the exemplary embodiments illustrated in the accompanying figures.

DESCRIPTION OF THE PREFERRED EMBODIMENT

Figure 1:
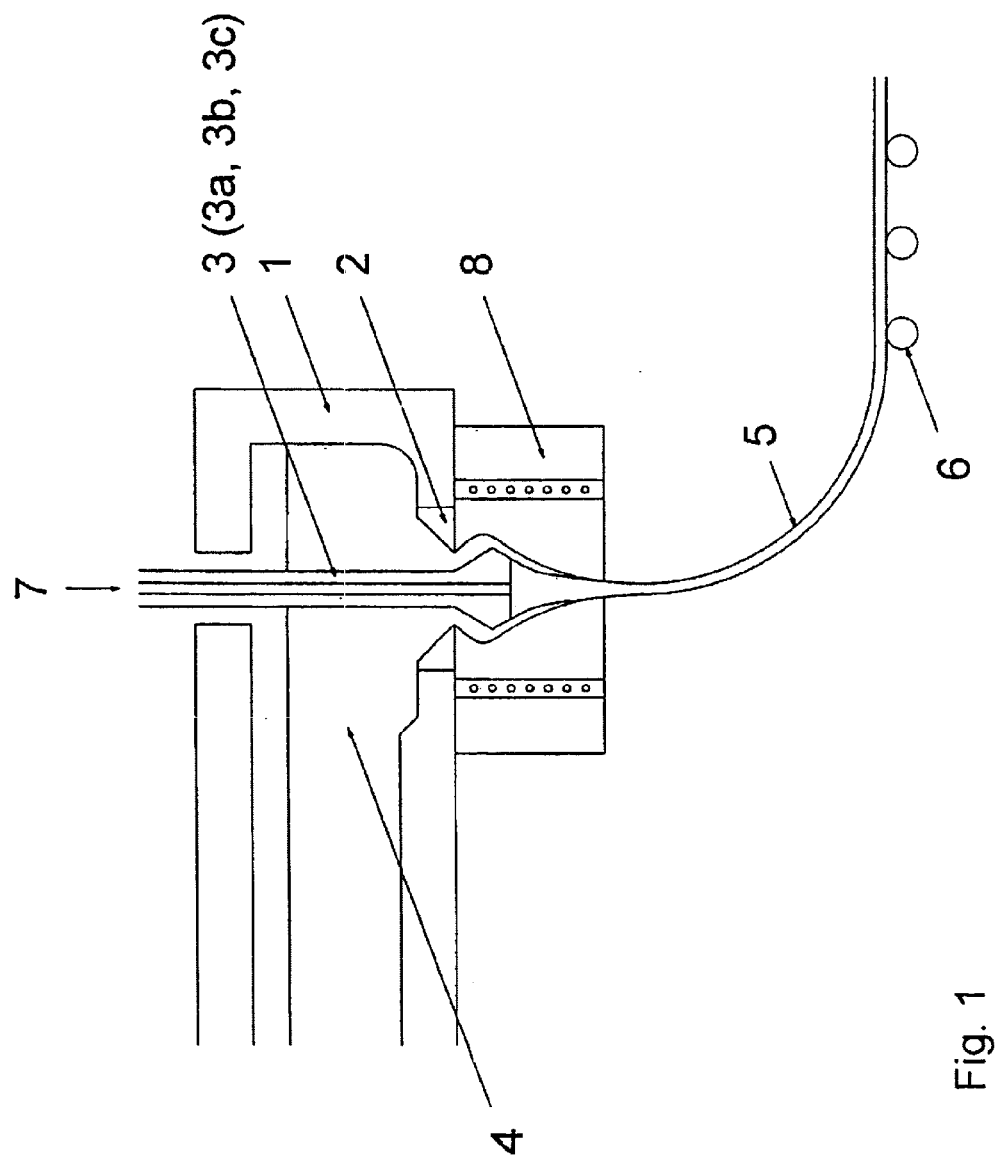
FIG. 1 is a schematic illustration of the construction of a device as claimed by the invention which is part of a Vello tube drawing plant.
Figure 2:
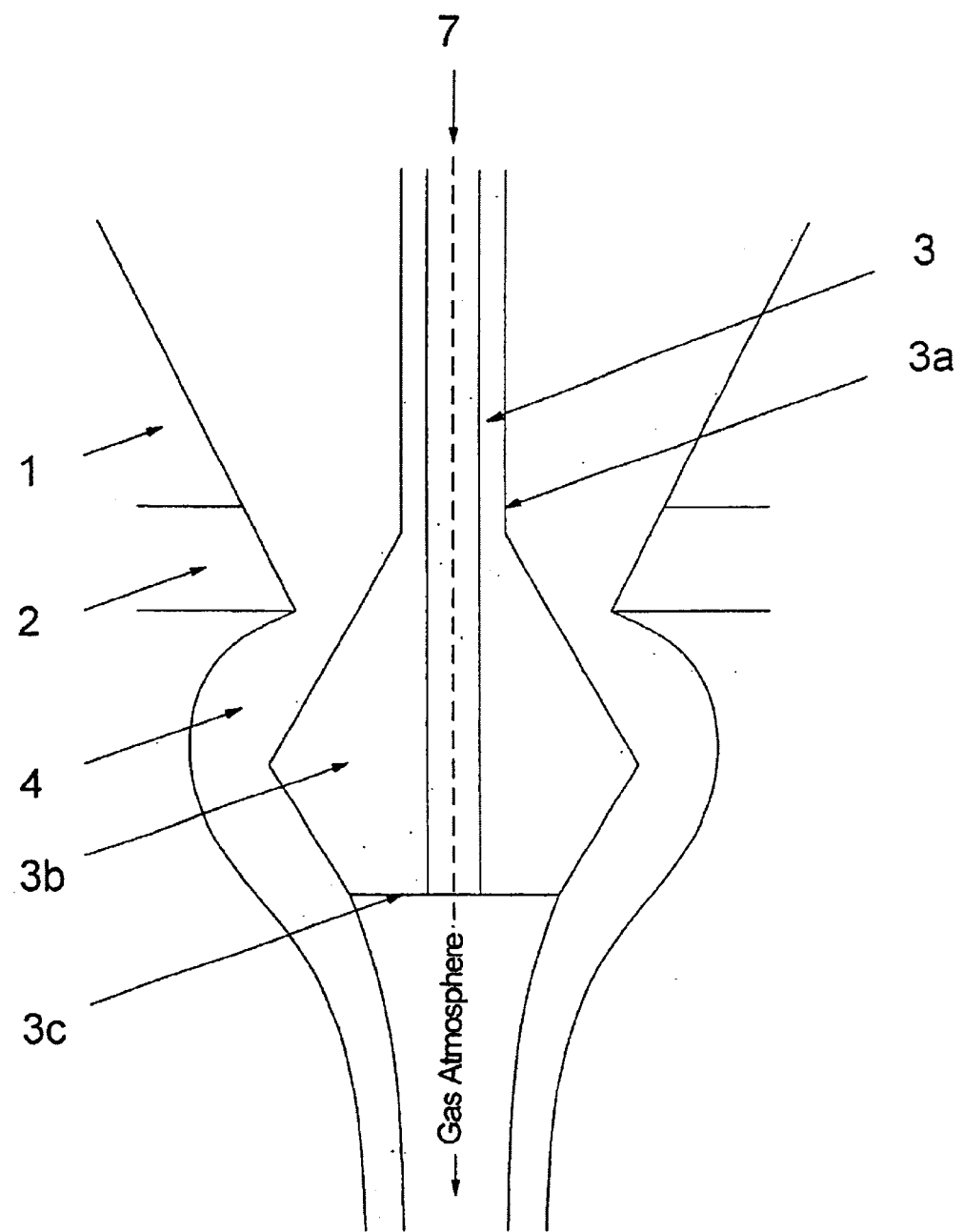
FIG. 2 is a schematic illustration of the lower end of the drawing mandrel illustrated in FIG. 1.

The device illustrated in FIGS. 1 and 2 is constructed as described below:

At the base of the gobbing end (1) of the feeder sits a discharge ring (2). In the center of this ring is the tube drawing mandrel (3). The mandrel consists of a long shaft (3a), the lower end of which widens conically. This cone, the needle head (3b), is located just underneath the discharge ring. The needle shaft is hollow to transport the gas atmosphere (7), so that the gas atmosphere can be blown through. The needle can be moved in the horizontal and vertical direction. The needle and ring are clad or coated with platinum, whereby the needle is clad with platinum both on its outer side, the one that comes into contact with the glass melt, and on its inner side, the one that is in contact with the gas atmosphere.

The glass melt (4) flows through the annular orifice between the needle (3) and the ring (2) and spreads out over the conical needle head (3b). From the edge of the needle head, the stripping edge (3c), it flows downward and forms a root. As the hollow strand (5) thus formed hangs, and before it solidifies, it is turned in the horizontal direction and is pulled by rollers or graphite blocks (6) by means of a tractor machine. The gas pressure of the gas atmosphere (7) can be set so that, in connection with different traction speeds, the quantity of glass to be processed can be manufactured in a broad range of dimensions.

The device further has means to produce and regulate the gas atmosphere, such as for example pressurized gas containers and valves, as well as means to set and regulate the oxygen content in the gas atmosphere. Depending on the oxygen content in the gas atmosphere, the surface condition and thus the surface characteristics of the glass tube can be modified and set as desired directly during the drawing process.

The forming area is located inside a heated muffle (8). A portion of the sag is shielded and protected from drafts. To improve the thermal and chemical homogeneity of the glass, a revolving tube can rotate around the needle. When the feeder trough is appropriately constructed and heated, the glass at the end of the feeder can be thermally homogenized to within a few degrees. In that case, the Vello process is superior to the Danner process with regard to the dimensional accuracy of the tubes drawn.

Like all drawing processes, the Vello process operates in a characteristic viscosity range, which is $10^4$ to $10^5$ dpas. The design of the drawing nozzle, of the feeder, of the heating system etc. can therefore be specified a priori for each type of glass.

In addition to the needle diameter, the throughput and the viscosity, other important process parameters are the gas pressure and the oxygen content of the gas atmosphere, the drawing speed and the length of the sag.

The length of the sag can be used as a means to increase output. Because the stream of glass must be placed on the line where the glass tubing is drawn in a certain viscosity range, so that it is neither too crooked (too cold) or oval-shaped (too hot), higher throughputs can be achieved with a long sag. Increasing the throughput requires an increase in the size of the drawing nozzle. The roots are drawn, in contrast to the Danner process, to a considerable extent by their own weight.

Exemplary Embodiments:

Using the Vello process, glass tubes were drawn with a device as claimed by the invention and illustrated in FIG. 1 or FIG. 2 from a glass melt that lies in the following composition range (in wt. % on an oxide basis): $SiO_2$ >55–64 and within the range percentages in tenth of percent steps such that any tenth of a percent may be a limit of a diminished range, $Al_2O_3$ 13–18 and within the range percentages in tenth of percent steps such that any tenth of a percent may be a limit of a diminished range, $B_2O_3$ 0–5.5 and within the range percentages in tenth of percent steps such that any tenth of a percent may be a limit of a diminished range, MgO 0–7 and within the range percentages in tenth of percent steps such that any tenth of a percent may be a limit of a diminished range, CaO 5–14 and within the range percentages in tenth of percent steps such that any tenth of a percent may be a limit of a diminished range, SrO 0–8 and within the range percentages in tenth of percent steps such that any tenth of a percent may be a limit of a diminished range, BaO 6–17 and within the range percentages in tenth of percent steps such that any tenth of a percent may be a limit of a diminished range, $ZrO_2$ 0–2 and within the range percentages in tenth of percent steps such that any tenth of a percent may be a limit of a diminished range, and $TiO_2$ 0–0.5 and within the range percentages in tenth of percent steps such that any tenth of a percent may be a limit of a diminished range, as well as fining agents in the usual amounts.

As the glass tubes were drawn, and with otherwise constant drawing parameters, only the oxygen content of the blowing gas was varied, and thus the surface condition of the inside of the glass tube was modified and set. A gas atmosphere was used that contained essentially nitrogen ($O_2$ content 0 vol. %), as well as a gas atmosphere that contained essentially nitrogen and 21 vol. % oxygen to blow the glass tubes.

The glass tubes manufactured in this manner are preferably used to manufacture high-temperature halogen lamp bulbs. To make the influence of the different gas atmospheres ($N_2$, air) on the layers near the surface detectable for purposes of analysis, the glass tubes drawn were tempered in the laboratory for 1 hour at 680° C. at a moisture level in the air of 1 vol. % $H_2O$, and then examined using SIMS (secondary ion mass spectroscopy).

Figure 3:
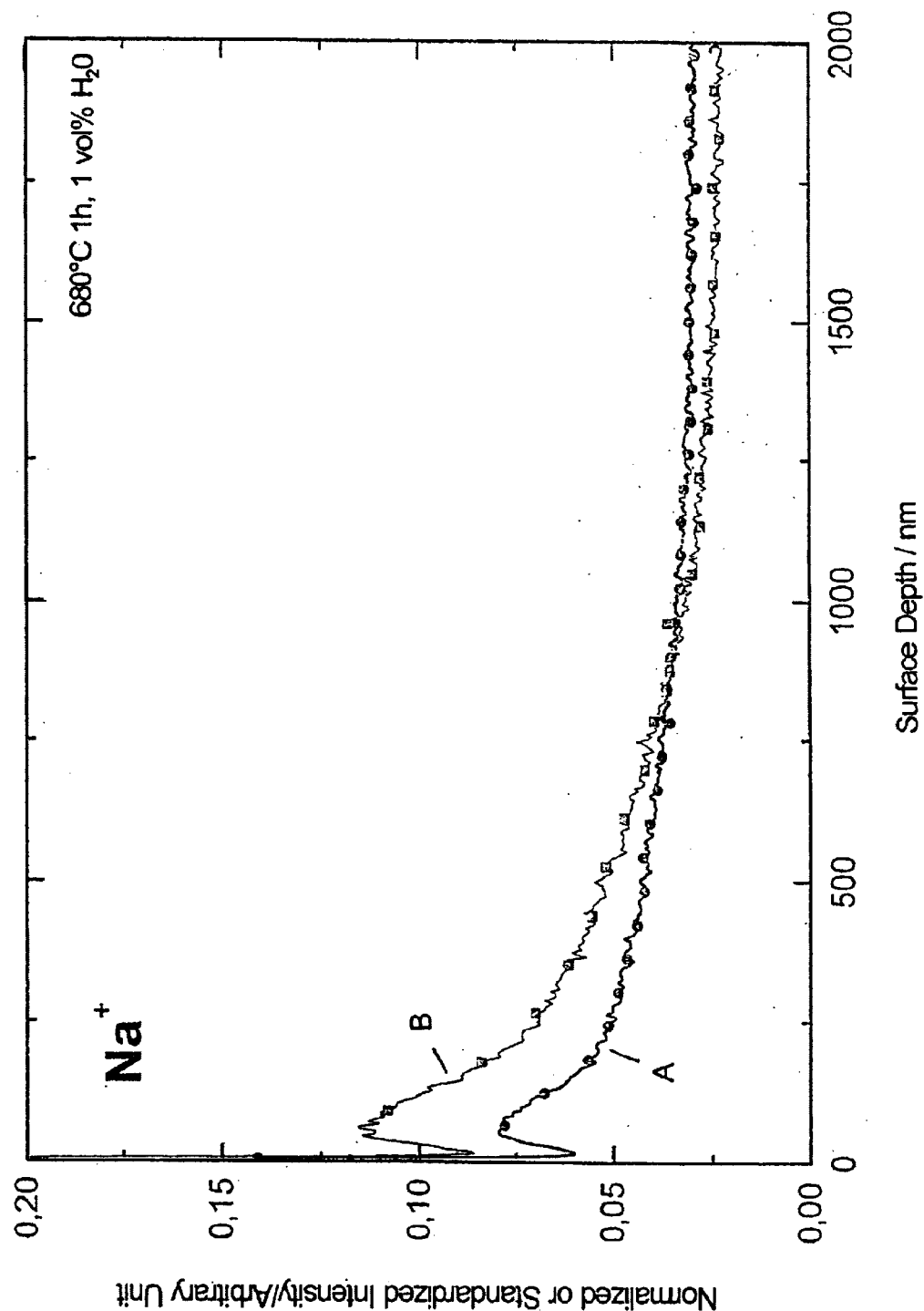
FIG. 3 shows the sodium ion concentration as a function of the surface depth and of the oxygen concentration in the gas atmosphere of a glass object manufactured as claimed by the invention, which object has been tempered for one hour at 680° C.

The surprising result of the determination of the sodium ion concentration using SIMS as a function of the surface depth was as follows (See FIG. 3):

The enrichment of sodium ions on the surface of the tempered glass tubes, down to a surface depth of approximately 750 nm for the glass tubes blown with 21 vol. % oxygen (Curve A) is much less than for the glass tubes blown essentially without oxygen (Curve B). These measurement results clearly show that the surface condition of the glass tube can be varied and controlled by means of the oxygen content of the gas atmosphere. For example, the higher the oxygen content of the gas atmosphere, the lower the expected enrichment of sodium ions in the outermost surface of the glass.

This surprising result is of particular importance for the use of the glass tubes manufactured as described in the exemplary embodiment in halogen lamp bulbs. Glass tubes of this type must be essentially free of alkali oxide, at least on their surface, because alkali ions disrupt the regenerative halogen cycle of the lamp.

During the operation of the lamp, an equilibrium is established between the formation and decay of tungsten halides from the tungsten vapor from the filament and the mixture of halogen and inert glass. The decay reaction thereby takes place at higher temperatures than the formation reaction, so that the tungsten is re-deposited on the filament. If this cycle is disrupted by contaminating components such as alkali ions, for example, the tungsten, instead of being deposited on the filament, is deposited on the inside of the glass bulb as a reflective black coating, and the lamp becomes unusable.

Darkening or blackening in tungsten-halogen lamps occurs because as a result of reactions of the halogen gas with the glass, the amount of halogen gas that must be present to maintain the halogen cycle is reduced to the extent that the halogen cycle collapses and tungsten is deposited as a black coating on the inside of the glass instead of on the filament. However, if the reactivity of the glass is reduced, less halogen gas can react with the glass, and, for example, less chloride from the halogen gas charge diffuses into the glass. Thus less halogen gas is removed from the halogen cycle and the darkening of the lamp by tungsten deposition on the inside of the glass is suppression. This suppression of the darkening can be clearly demonstrated by lamp test results.

Halogen lamps were manufactured from the glass tubes drawn with different gas atmospheres ($N_2$, air) during production. These halogen lamps were tested under identical conditions. It was determined that the illumination time until darkening occurred can be increased by 1–5 to 2 times from approximately 100 hours, if the glass tubes are drawn with air instead of with $N_2$.

The free valences of the glass surface formed during the hot forming were influenced by the respective oxygen content of the gas atmospheres, and the surface condition was thereby modified, and set as desired by means of the oxygen content.

The following influences or modifications of the surface condition of a glass object are therefore conceivable:

Influencing the glass structure of the surface

Influencing the surface activity of the glass

Modification of the surface condition compared to the volume

Modification of the bonding conditions on the surface compared to the volume

Influencing and controlled setting of the degree of oxidation of the surface

Formation of a thin special composition as a coating on the surface by interaction of the hot glass melt with the gas atmosphere Formation of reactive glass surfaces Influencing of the glass surfaces as a function of the temperature Controlled setting of the chemical and physical characteristics of the glass surface Modification of the characteristics of the glass surface compared to bulk material Polarization of the surface Promoting or preventing transport by controlled gas compositions Production of diffusion-blocking layers.

Using the method and the device claimed by the invention, it is therefore possible to make available glass objects, the surface of which is modified and improved so that they can be used, for example, as semi-finished products for molded glass objects for which there are stringent requirements regarding their surface characteristics such as chemical resistance/reactivity of the surface.

The glass tubes manufactured by the method claimed by the invention are therefore excellently suited for use of the following products, for example:

Lamp bulbs, in particular lamp bulbs for halogen lamps,

Containers for medical and pharmaceutical products such as ampoules, bottles, vials, cylinder ampoules, pharmaceutical primary packaging, Reagent containers, test tubes, burets, pipettes, titration cylinders, Tubular parts for chemical equipment construction.

Because in the method claimed by the invention, the improved glass objects can be manufactured continuously and without additional process steps, compared to the manufacture of unimproved glass tubes, it represents a very simple and economic method, compared to the methods of the prior art, such as the leaching of the inner surface of glass tubes or even the internal coating of hollow glass moldings.

One feature of the invention resides broadly in the hot forming method for the production of a glass object from a glass melt, whereby during the hot forming the surface of the glass object is exposed at least partly to a specified gas atmosphere, characterized by the fact that a gas atmosphere with a set and regulated oxygen content is used, whereby the surface condition of the glass object is set and modified by means of the set and regulated oxygen content of the gas atmosphere.

Another feature of the invention resides broadly in the hot forming method characterized by the fact that the oxygen content of the gas atmosphere is set and regulated in the range from 0 to 100 vol. %.

Yet another feature of the invention resides broadly in the hot forming method characterized by the fact that the oxygen content of the gas atmosphere is defined and regulated in the range of 0 to 80 vol. %.

Still another feature of the invention resides broadly in the hot forming method characterized by the fact that the oxygen content of the gas atmosphere is defined and regulated in the range of 10 to 30 vol. %.

A further feature of the invention resides broadly in the hot forming method characterized by the fact that the gas atmosphere, which contains additional gases in addition to oxygen, in particular nitrogen, inert gases, $CO_2$, $SO_2$ and/or $H_2O$, the concentration of which is also set and regulated.

Another feature of the invention resides broadly in the hot forming method characterized by the fact that the surface condition of the glass object is set and modified up to a surface depth of 2000 nm, in particular 1000 nm.

Yet another feature of the invention resides broadly in the hot forming method characterized by the fact that the glass object is drawn from a glass melt.

Still another feature of the invention resides broadly in the hot forming method characterized by the fact that a glass tube is drawn from a glass melt.

A further feature of the invention resides broadly in the hot forming method characterized by the fact that during the drawing of the tube, the inner surface of the glass tube is exposed to the gas atmosphere.

Another feature of the invention resides broadly in the hot forming method characterized by the fact that a flat glass is drawn from a glass melt.

Yet another feature of the invention resides broadly in the hot forming method characterized by the fact that the glass object is formed from a glass melt, the viscosity of which is in the range of $10^4$ to $10^5$ dpas.

Still another feature of the invention resides broadly in the hot forming method characterized by the fact that the glass object is formed from a hot glass melt at a temperature of more than 1000° C., in particular from a hot glass melt at a temperature of more than 1200° C.

A further feature of the invention resides broadly in the hot forming method characterized by the fact that the glass object is formed from a borosilicate glass melt, a neutral glass melt or an aluminosilicate glass melt.

Another feature of the invention resides broadly in the hot forming method characterized by the fact that the glass object is formed from a glass melt having the following composition (in wt. % on an oxide basis): $SiO_2$ 40–75 and within the range percentages in tenth of percent steps such that any tenth of a percent may be a limit of a diminished range, $Al_2O_3$ 10–27 and within the range percentages in tenth of percent steps such that any tenth of a percent may be a limit of a diminished range, $B_2O_3$ 0–15 and within the range percentages in tenth of percent steps such that any tenth of a percent may be a limit of a diminished range, MgO 0–10 and within the range percentages in tenth of percent steps such that any tenth of a percent may be a limit of a diminished range, CaO 0–12 and within the range percentages in tenth of percent steps such that any tenth of a percent may be a limit of a diminished range, SrO 0–12 and within the range percentages in tenth of percent steps such that any tenth of a percent may be a limit of a diminished range, BaO 0–30 and within the range percentages in tenth of percent steps such that any tenth of a percent may be a limit of a diminished range, ZnO 0–10 and within the range percentages in tenth of percent steps such that any tenth of a percent may be a limit of a diminished range, $ZrO_2$ 0–5 and within the range percentages in tenth of percent steps such that any tenth of a percent may be a limit of a diminished range, $Li_2O+Na_2O+K_2O$ 0–7 and within the range percentages in tenth of percent steps such that any tenth of a percent may be a limit of a diminished range, $TiO_2$ 0–5.5 and within the range percentages in tenth of percent steps such that any tenth of a percent may be a limit of a diminished range, $P_2O_5$ 0–9.0 and within the range percentages in tenth of percent steps such that any tenth of a percent may be a limit of a diminished range, as well as optional fining agents and coloring components in conventional quantities.

Yet another feature of the invention resides broadly in the hot forming method characterized by the fact that the glass object is formed from a glass melt having the following composition (in wt. % on an oxide basis): $SiO_2$ 60–80 and within the range percentages in tenth of percent steps such that any tenth of a percent may be a limit of a diminished range, $Al_2O_3$ 2–10 and within the range percentages in tenth of percent steps such that any tenth of a percent may be a limit of a diminished range, $B_2O_3$ 5–20 and within the range percentages in tenth of percent steps such that any tenth of a percent may be a limit of a diminished range, MgO 0–8 and within the range percentages in tenth of percent steps such that any tenth of a percent may be a limit of a diminished range, CaO 0–12 and within the range percentages in tenth of percent steps such that any tenth of a percent may be a limit of a diminished range, SrO 0–8 and within the range percentages in tenth of percent steps such that any tenth of a percent may be a limit of a diminished range, BaO 0–12 and within the range percentages in tenth of percent steps such that any tenth of a percent may be a limit of a diminished range, ZnO 0–10 and within the range percentages in tenth of percent steps such that any tenth of a percent may be a limit of a diminished range, $ZrO_2$ 0–5 and within the range percentages in tenth of percent steps such that any tenth of a percent may be a limit of a diminished range, $Li_2O+Na_2O+K_2O$ 2–12 and within the range percentages in tenth of percent steps such that any tenth of a percent may be a limit of a diminished range, as well as optional fining agents and coloring components in conventional quantities.

Still another feature of the invention resides broadly in the apparatus for the hot forming of a glass object from a glass melt, whereby the surface of the glass object is at least partly exposed to a gas atmosphere during the hot forming, characterized by the fact that the apparatus has means for the hot forming of the glass object from a glass melt, means for the production of the gas atmosphere, means to define and regulate a specified oxygen content in the gas atmosphere and means to guide the gas atmosphere at least partly along at least one surface of the glass object.

A further feature of the invention resides broadly in the apparatus characterized by the fact that the means for the hot forming of the glass object and the means to guide the gas atmosphere can withstand a temperature of more than 1000° C., in particular a temperature of more than 1200° C.

Another feature of the invention resides broadly in the apparatus characterized by the fact that the means for the hot forming of the glass object and/or the means to guide the gas atmosphere are coated at least partly with platinum or an alloy that contains platinum and/or are made of platinum or an alloy that contains platinum.

Yet another feature of the invention resides broadly in the apparatus characterized by the fact that the apparatus is part of a drawing plant, in particular part of a tube drawing plant or part of a flat glass drawing plant.

Still another feature of the invention resides broadly in the use of the glass object produced by the hot forming method for the production of light bulbs, in particular for the production of heavy-duty halogen light bulbs.

A further feature of the invention resides broadly in the use of the glass object produced using the hot forming method for the production of containers, in particular containers that are used as primary packaging material for pharmaceutical products.

Another feature of the invention resides broadly in a hot forming method and a device for the manufacture of a glass object from a glass melt, whereby the surface of the glass object is exposed at least partly to a specified gas atmosphere during the hot forming, as well as to a use of the glass objects. The hot forming method teaches that a gas atmosphere with a set and controllable oxygen content is used, whereby the surface condition of the glass object can be modified and set by setting and regulating the oxygen content in the gas atmosphere.

This invention further relates to a hot forming method and an apparatus for the manufacture of a glass object from a glass melt, whereby the surface of the glass object is exposed at least partly to a defined gas atmosphere during the hot forming, as well as to a use of the glass object.

The corresponding foreign patent publication applications, namely, Federal Republic of Germany Patent Application No. DE 100 16 108.1, filed on Mar. 31, 2000, having inventors Franz OTT, Otmar BECKER, and Karin NAUMANN, as well as DE-OS 100 16 108.1 and DE-PS 100 16 108.1, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

Figure 4:
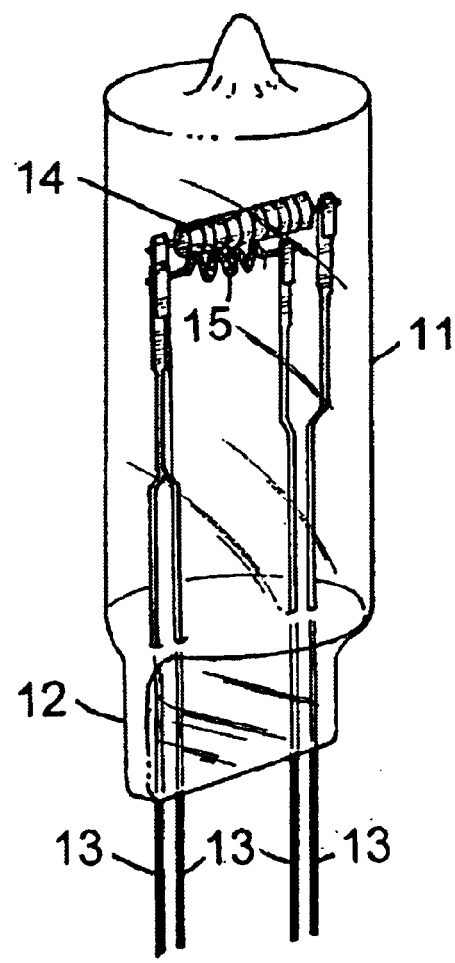
FIG. 4 is a perspective view of a halogen lamp bulb in accordance with one aspect of the invention.

FIG. 4 is a copy of the FIG. 1 from U.S. Pat. No. 4,140,939 issued to Bonazoli et al. on Feb. 20, 1979 and entitled "Tungsten halogen lamp for headlights" from which figure copy all of the reference numerals present in the original figure, as it appears in U.S. Pat. No. 4,140,939, have been removed. U.S. Pat. No. 4,140,939 is hereby incorporated by reference as if set forth in its entirety. The reference numerals that have been removed from the figure for this U.S. patent, essentially reproduced herein as FIG. 4, indicate arrangements that are well known in the prior art.

Thus, in one possible embodiment of the present invention, illustrated in FIG. 4, the present invention is shown in a possible embodiment of a halogen lamp bulb comprising a glass capsule or body 11 having a seal 12 at one end with lead-in wires 13 extending through seal 12. The capsule or body 11 contains a gaseous filling including halogen. Supported on the internal ends of lead-in wires 13 are two spaced apart tungsten filaments 14 and 15. Filament 14 is a coiled filament and filament 15 is a coiled coil filament. Filaments 14 and 15 are in the same plane, substantially orthogonal to the axis of capsule 11, and are laterally offset in order to provide proper orientation of the beams radiated by the lamp assembly.

Figure 5:
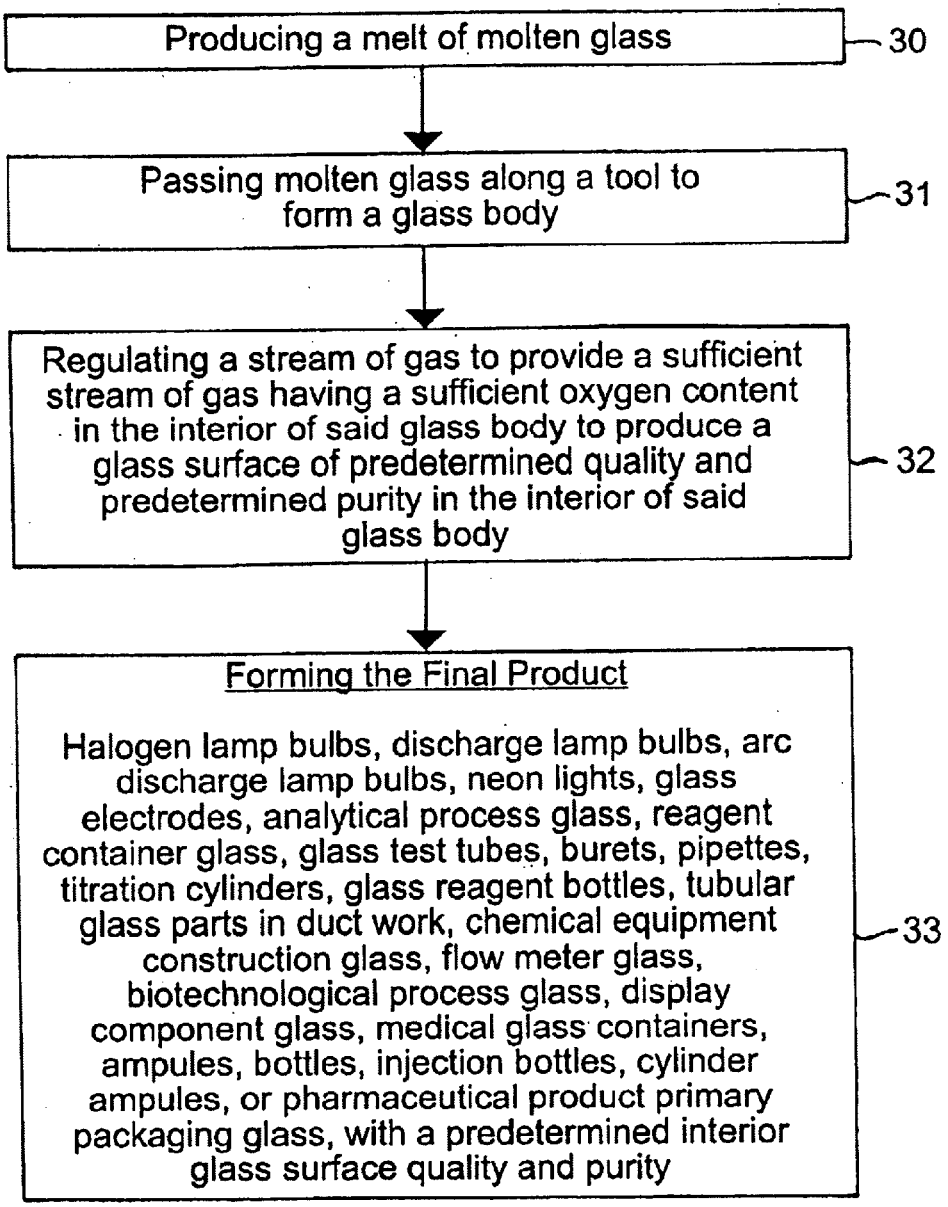
FIG. 5 is a simplified flow chart of a possible process in accordance with one aspect of the invention.

FIG. 5 illustrates a possible embodiment of method in accordance with the invention. Thus, in step 30 there is produced a melt of molten glass, for example, at a temperature of 1300 degrees Celsius. In step 31, so as to form a body of glass by hot forming, molten glass is passed along a tool to form a glass body, this may be a hollow glass body or possibly a flat body of glass. In step 32 there is passed a stream of gas having a sufficient oxygen content through the interior of the glass body that is being formed, or possibly along a surface of the flat body of glass, so as to minimize sodium ions and/or alkali oxides in the body of glass that is being formed to produce a glass surface of predetermined quality and predetermined purity. In step 33 the glass is formed to final shape. Typical products of such method include halogen lamp bulbs, discharge lamp bulbs, arc discharge lamp bulbs, neon lights, glass electrodes, analytical process glass, reagent container glass, glass test tubes, burets, pipettes, titration cylinders, glass reagent bottles, tubular glass parts in duct work, chemical equipment construction glass, flow meter glass, biotechnological process glass, display component glass, medical glass containers, ampules, bottles, injection bottles, cylinder ampules, or pharmaceutical product primary packaging glass.

Aluminosilicate glass in accordance with the present invention may, for example, have any value (in % by weight, based on oxide) of $Al_2O_3$ (alumina, aluminum oxide) in the range of from about 10 to about 27, for example, 11 and 26, and within the range percentages in tenth of percent steps such that any tenth of a percent may be a limit of a diminished range. Thus, the value for $Al_2O_3$, in % by weight, based on oxide, is not limited to the first and final values of the range, but can comprise any value of $Al_2O_3$ between them.

Other components and quantities of the glass in accordance with our invention are likewise not limited to the first and final values of the indicated range, but can comprise any value between them.

It will be appreciated that the concentration and rate of flow of oxygen or oxygen-containing gas, also referred to as stream of gas herein, is in conformity with the particular manufacturing method, size of the equipment employed and the like parameters.

Some examples of borosilicate glass compositions which may possibly be incorporated in an embodiment of the present invention may be found in U.S. Pat. No. 4,536,329 issued to Hormadaly on Aug. 20, 1985 and entitled "Borosilicate glass composition"; U.S. Pat. No. 4,537,703 issued to Hormadaly on Aug. 27, 1985 and entitled "Borosilicate glass compositions"; U.S. Pat. No. 4,870,034 issued to Kiefer on Sep. 26, 1989 and entitled "Borosilicate glass"; U.S. Pat. No. 5,219,801 issued to Shorrock et al. on Jun. 15, 1993 and entitled "Borosilicate glass composition"; U.S. Pat. No. 5,480,846 issued to Sundberg et al. on Jan. 2, 1996 and entitled "Borosilicate glass"; U.S. Pat. No. 5,599,753 issued to Watzke et al. on Feb. 4, 1997 and entitled "Borosilicate glass weak in boric acid"; and U.S. Pat. No. 6,118,216 issued to Marlor on Sep. 12, 2000 and entitled "Lead and arsenic free borosilicate glass and lamp containing same", all of these U.S. patents being hereby expressly incorporated by reference as if set forth in their entirety herein.

Some examples of features relating to neutral glass compositions which may possibly be incorporated in an embodiment of the present invention may be found in U.S. Pat. No. 4,873,206 issued to Jones on Oct. 10, 1989 and entitled "Dark, neutral, gray, nickel-free glass compositions"; U.S. Pat. No. 5,413,971 issued to McPherson on May 9, 1995 and entitled "Laser absorbing filter glass"; U.S. Pat. No. 5,662,918 issued to Winter et al. on Sep. 2, 1997 and entitled "Pharmaceutical agents containing diphosphonic acids and salts thereof", which includes a description of neutral glass as the material for the container for the agent; and U.S. Pat. No. 5,650,365 issued to Higby et al. on Jul. 22, 1997 and entitled "Neutral low transmittance glass", all of these U.S. patents being hereby expressly incorporated by reference as if set forth in their entirety herein.

Some examples of aluminosilicate glass compositions which may possibly be incorporated in an embodiment of the present invention may be found in U.S. Pat. No. 4,366,409 issued to Nieda et al. on Dec. 28, 1982 and entitled "Halogen incandescent lamp"; U.S. Pat. No. 4,530,909 issued to Makishima et al. on Jul. 23, 1985 and entitled "Aluminosilicate glass containing $Y_2O_3$ concentrate and $ZrO_2$"; U.S. Pat. No. 4,626,515 issued to Chyung et al. on Dec. 2, 1986 and entitled "Alkaline earth aluminosilicate glasses"; U.S. Pat. No. 4,814,297 issued to Beall et al. on Mar. 21, 1989 and entitled "Strengthened glass article and method"; and U.S. Pat. No. 6,069,100 issued to Naumann et al. on May 30, 2000 and entitled "Glass for lamp bulbs capable of withstanding high temperatures", all of these U.S. patents being hereby expressly incorporated by reference as if set forth in their entirety herein.

Some references referring to the Vello process, features of which may possibly be incorporated in an embodiment of the present invention may be found in U.S. Pat. No. 6,017, 838 issued to Marlor on Jan. 25, 2000 and entitled "Lead free soft glass having high electrical resistivity"; U.S. Pat. No. 1,606,276 issued to Vello on Nov. 9, 1926 and entitled "Apparatus and method for the production of incandescent lamps"; and U.S. Pat. No. 1,861,167 issued to Vello on May 31, 1932 and entitled "Bulb, tube, or other hermetically closed receptacle for incandescent electric lamps and similar devices and process of manufacture of the same", all of these U.S. patents being hereby expressly incorporated by reference as if set forth in their entirety herein.

Some references referring to the Danner process, features of which may possibly be incorporated in an embodiment of the present invention may be found in U.S. Pat. No. 1,261,366 issued to Danner on Apr. 2, 1918 and entitled "Method of forming sheet glass"; U.S. Pat. No. 1,261,367 issued to Danner on Apr. 2, 1918 and entitled "Apparatus for forming sheet glass"; U.S. Pat. No. 1,269,791 issued to Danner on Jun. 18, 1918 and entitled "Process for forming glass article"; U.S. Pat. No. 1,734,965 issued to Danner on Nov. 12, 1929 and entitled "Method and apparatus for forming glassware"; U.S. Pat. No. 2,390,926 issued to Danner on Dec. 11, 1945 and entitled "Hollow glassware-forming apparatus"; and U.S. Pat. No. 4,936,891 issued to Günthner on Jun. 26, 1990 and entitled "Process and apparatus for the vertical drawing of glass tubes with sealed bottoms", all of these U.S. patents being hereby expressly incorporated by reference as if set forth in their entirety herein.

Some examples of tubular glass embodiments in which may possibly be incorporated embodiments of the present invention may be found in U.S. Pat. No. 4,038,577 issued to Bode et al. on Jul. 26, 1977 and entitled "Gas discharge display device having offset electrodes"; U.S. Pat. No. 4,666,488 issued to Mitzutani et al. on May 19, 1987 and entitled "Process of producing a highly pure glass tube"; U.S. Pat. No. 4,835,443 issued to Benson et al. on May 30, 1989 and entitled "High voltage hard glass halogen capsule"; U.S. Pat. No. 5,080,705 issued to Ott et al. on Jan. 14, 1992 and entitled "Method and apparatus for manufacturing profiled glass tubing"; and U.S. Pat. No. 5,785,729 issued to Yokokawa et al. on Jul. 28, 1998 and entitled "Method for manufacturing large-sized quartz glass tube", all of these U.S. patents being hereby expressly incorporated by reference as if set forth in their entirety herein.

Some examples of oxygen probes and oxygen treatment methods and apparatus which may possibly be incorporated in an embodiment of the present invention may be found in U.S. Pat. No. 4,384,934 issued to de Bruin et al. on May 24, 1983 and entitled "Means for determining the partial pressure of oxygen in an atmosphere"; U.S. Pat. No. 4,548,680 issued to de Bruin et al. on Oct. 22, 1985 and entitled "Method for determining the partial pressure of oxygen in an atmosphere"; U.S. Pat. No. 5,670,032 issued to Friese et al. on Sep. 23, 1997 and entitled "Electro-chemical measuring sensor with a potential-free sensor element and method for producing it"; U.S. Pat. No. 5,723,337 issued to Muller et al. on Mar. 3, 1998 and entitled "Method for measuring and controlling the oxygen concentration in silicon melts and apparatus therefor"; U.S. Pat. No. 5,888,265 issued to Bonaquist et al. on Mar. 30, 1999 and entitled "Air separation float glass system"; U.S. Pat. No. 5,906,119 issued to Boillet on May 25, 1999 and entitled "Process and device for melting glass"; U.S. Pat. No. 5,939,313 issued to Cheng on Aug. 17, 1999 and entitled "Stationary vortex system for direct injection of supplemental reactor oxygen"; U.S. Pat. No. 5,942,674 issued to Logothetis et al. on Aug. 24, 1999 and entitled "Method for detecting oxygen partial pressure using a phase-transformation sensor"; U.S. Pat. No. 5,976,992 issued to Ui et al. on Nov. 2, 1999 and entitled "Method of supplying excited oxygen"; U.S. Pat. No. 6,004,378 issued to Reiss et al. on Dec. 21, 1999 and entitled "Oxygen enrichment process"; U.S. Pat. No. 6,079,225 issued to Ruppert et al. on Jun. 27, 2000 and entitled "Method for the production of a quartz glass blank and apparatus suitable therefor"; U.S. Pat. No. 6,117,210 issued to Prasad et al. on Sep. 12, 2000 and entitled "Solid electrolyte system for producing controlled purity oxygen"; U.S. Pat. No. 6,156,921 issued to Wagner et al. on Dec. 5, 2000 and entitled "Method and apparatus for direct oxygen injection with a reactant stream into a fluidized bed reactor"; U.S. Pat. No. 6,177,001 B1 issued to Meyer on Jan. 23, 2001 and entitled "Internally calibrated oxygen sensor, method and system"; and U.S. Pat. No. 6,068,889 issued to Seeman on May 30, 2000 and entitled "Method for lubricating glass molds, plungers and the like", all of these U.S. patents being hereby expressly incorporated by reference as if set forth in their entirety herein.

Some examples of flat gas production which may possibly be incorporated in an example of the present invention may be found in U.S. Pat. No. 3,218,143 issued to De Lajarte on Nov. 16, 1965 and entitled "Process for the manufacture of flat glass"; U.S. Pat. No. 3,930,826 issued to Schornhorst on Jan. 6, 1976 and entitled "Conditioning flat glass for removal from supporting liquid following forming"; U.S. Pat. No. 3,938,979 issued to Plumat on Feb. 17, 1976 and entitled "Method and apparatus for vertically drawing a glass ribbon"; U.S. Pat. No. 4,801,321 issued to Pita et al. on Jan. 31, 1989 and entitled "Method for the manufacturing of glass sheets"; U.S. Pat. No. 4,214,886 issued to Shay et al. on Jul. 29, 1980 and entitled "Forming laminated sheet glass"; U.S. Pat. No. 4,209,315 issued to Spurling on Jun. 24, 1980 and entitled "Glass forming apparatus"; U.S. Pat. No. 4,929,266 issued to Cozac et al. on May 29, 1990 and entitled "Method of manufacturing glass"; and U.S. Pat. No. 5,078,777 issued to Cozac et al. on Jan. 7, 1992 and entitled "Glass-melting furnace", all of these U.S. patents being hereby expressly incorporated by reference as if set forth in their entirety herein.

Some examples of methods and apparatus of forming tubular glass and hot forming which may possibly be incorporated in an embodiment of the present invention may be found in U.S. Pat. No. 3,754,883 issued to Keefer et al. on Aug. 28, 1973 and entitled "Glass tube forming apparatus and method"; U.S. Pat. No. 3,937,623 issued to Kononko et al. on Feb. 10, 1976 and entitled "Method of making glass tubes"; U.S. Pat. No. 4,175,942 issued to Lipp on Nov. 27, 1979 and entitled "Method of glass drawing"; U.S. Pat. No. 4,340,410 on Jul. 20, 1982 and entitled "Float glass forming chamber with isolated heating means"; U.S. Pat. No. 4,340,412 issued to May on Jul. 20, 1982 and entitled "Float glass forming chamber with externally supported roof"; U.S. Pat. No. 4,615,916 issued to Henderson on Oct. 7, 1986 and entitled "Surface treatment of glass containers"; U.S. Pat. No. 4,966,629 issued to Tsukiyama et al. on Oct. 30, 1990 and entitled "Hot forming mold and method of manufacturing the same"; U.S. Pat. No. 5,559,060 issued to Dumbaugh, Jr. et al. on Sep. 24, 1996 and entitled "Glass for laminated glass articles"; U.S. Pat. No. 5,967,871 issued to Kaake et al. on Oct. 19, 1999 and entitled "Method for making black glass substrate for plasma display panel"; U.S. Pat. No. 5,987,923 issued to Ostendarp et al. on Nov. 23, 1999 and entitled "Process and apparatus for hot forming precision structures in flat glass"; and U.S. Pat. No. 6,098,426 issued to Anderson et al. on Aug. 8, 2000 and entitled "Method and apparatus for forming a glass article possessing an aperture", all of these U.S. patents being hereby expressly incorporated by reference as if set forth in their entirety herein.

Some examples of glass containers for pharmaceutical products and methods of making them, features of which may possibly be incorporated in an embodiment of the present invention may be found in U.S. Pat. No. 3,499,775 issued to Albinak et al. on Mar. 10, 1970 and entitled "Ultraviolet-absorbing glass compositions containing cerium and molybdenum oxides"; U.S. Pat. No. 5,736,476 issued to Watzke et al. on Apr. 7, 1998 and entitled "Borosilicate glass of high chemical resistance and low viscosity which contains zirconium oxide and lithium oxide"; U.S. Pat. No. 5,779,753 issued to Vetter et al. on Jul. 14, 1998 and entitled "Method of an apparatus for treating a solid workpiece, especially a glass tube"; and U.S. Pat. No. 6,156,399 issued to Spallek et al. on Dec. 5, 2000 and entitled "Glass container which may be sterilized for medical purposes, in particular for the storage of pharmaceutical or diagnostic products", all of these U.S. patents being hereby expressly incorporated by reference as if set forth in their entirety herein.

Some examples relating to methods of making halogen lamp bulbs and relating to halogen lamp bulbs, features of which may possibly be incorporated in an embodiment of the present invention may be found in U.S. Pat. No. 4,140,939 issued to Bonazoli et al. on Feb. 20, 1979 and entitled "Tungsten halogen lamp for headlights"; U.S. Pat. No. 4,319,156 issued to Bienvenue et al. on Mar. 9, 1982 and entitled "Vehicle headlight having dual filament tungsten halogen lamp"; U.S. Pat. No. 4,339,685 issued to Saguchi et al. on Jul. 13, 1982 and entitled "Sealed beam lamp assembly"; U.S. Pat. No. 4,342,142 issued to Nieda et al. on Aug. 3, 1982 and entitled "Method for manufacturing sealed-beam type electric bulb"; U.S. Pat. No. 4,540,911 issued to Arai et al. on Sep. 10, 1985 and entitled "Halogen lamp unit"; U.S. Pat. No. 4,607,016 issued to Danielson et al. on Aug. 19, 1986 and entitled "Glass for use as tungsten-halogen lamp envelopes"; U.S. Pat. No. 4,801,845 issued to Kiesel on Jan. 31, 1989 and entitled "Halogen incandescent lamp structure"; U.S. Pat. No. 5,513,08 issued to Ho on Apr. 30, 1996 and entitled "Ultraviolet-reduced halogen lamp"; U.S. Pat. No. 5,850,124 issued to Hasegawa et al. on Dec. 15, 1998 and entitled "Automobile lamp bulb with welded low beam shield"; U.S. Pat. No. 5,855,430 issued to Coushaine et al. on Jan. 5, 1999 and entitled "Vehicle headlamp assembly"; U.S. Pat. No. 5,949,181 issued to Tabata et al. on Sep. 7, 1999 and entitled "Automotive lamp bulb with alignment bead"; U.S. Pat. No. 5,984,750 issued to Nishibori et al. on Nov. 16, 1999 and entitled "Method of sealing halogen lamp"; and U.S. Pat. No. 6,183,113 B1 issued to Waldmann on Feb. 6, 2001 and entitled "Halogen lamp", all of these U.S. patents being hereby expressly incorporated by reference as if set forth in their entirety herein.

Some examples relating to discharge lamp bulbs and arc discharge lamp bulbs and to methods of making discharge lamp bulbs and arc discharge lamp bulbs, features of which may possibly be incorporated in an embodiment of the present invention may be found in U.S. Pat. No. 4,754,195 issued to Rasch et al. on Jun. 28, 1988 and entitled "High-pressure discharge lamp, and method of its manufacture; U.S. Pat. No. 4,840,593 issued to Takeda et al. on Jun. 20, 1989 and entitled "Low pressure mercury vapor discharge lamp and preparation thereof"; U.S. Pat. No. 4,910,431 issued to Witt et al. on Mar. 20, 1990 and entitled "Hydrogen discharge ultraviolet light source or lamp, and method of its manufacture"; U.S. Pat. No. 5,083,065 issued to Sakata et al. on Jan. 21, 1992 and entitled "Lighting device for electric discharge lamp"; U.S. Pat. No. 5,769,678 issued to Mohacsi on Jun. 23, 1998 and entitled "Method of sealing vacuum ports in low pressure gas discharge lamps"; U.S. Pat. No. 6,179,45 B1 issued to Nakamura et al. on Jan. 30, 2001 and entitled "Vehicle lamp with protective film and method for making same"; and U.S. Pat. No. 6,181,054 B1 issued to Levin et al. on Jan. 30, 2001 and entitled "Lamp bulb with integral reflector", all of these U.S. patents being hereby expressly incorporated by reference as if set forth in their entirety herein.

Some examples of neon lights and the manufacture thereof, features of which may possibly be incorporated in an embodiment of the present invention may be found in U.S. Pat. No. 4,998,365 issued to Bezek on Mar. 12, 1991 and entitled "Segmented neon display"; U.S. Pat. No. 5,237,765 issued to Vargish, II on Aug. 24, 1993 and entitled "Illuminated display sign"; and U.S. Pat. No. 5,339,230 issued to Devorris on Aug. 16, 1994 and entitled "Encapsulated charged gas light apparatus", all of these U.S. patents being hereby expressly incorporated by reference as if set forth in their entirety herein.

Some examples of glass electrodes and the manufacture thereof, features of which may possibly be incorporated in an embodiment of the present invention may be found in U.S. Pat. No. 3,410,777 issued to Ross on Nov. 12, 1968 and entitled "Glass electrode composition"; U.S. Pat. No. 3,480,536 issued to Arthur on Nov. 25, 1969 and entitled "Ion sensitive lanthanum-cerium containing glass electrode"; U.S. Pat. No. 3,713,992 issued to Akazawa on Jan. 30, 1973 and entitled "Glass electrode for determining ph value at super high temperatures"; U.S. Pat. No. 4,028,196 issued to Young on Jun. 7, 1977 and entitled "Ph responsive glass compositions and electrodes"; and U.S. Pat. No. 4,297,193 issued to Brezinski et al. on Oct. 27, 1981 and entitled "Ph electrode glass composition", all of these U.S. patents being hereby expressly incorporated by reference as if set forth in their entirety herein.

Some examples of burets and pipettes and methods of making them, features of which may possibly be incorporated in an embodiment of the present invention may be found in U.S. Pat. No. 4,530,712 issued to Kopf on Jul. 23, 1985 and entitled "Pipette puller"; U.S. Pat. No. 5,580,528 issued to Demers on Dec. 3, 1996 and entitled "Breakage resistant laboratory glassware article"; and U.S. Pat. No. 4,600,424 issued to Flaming on Jul. 15, 1986 and entitled "Method of forming an ultrafine micropipette", all of these U.S. patents being hereby expressly incorporated by reference as if set forth in their entirety herein.

An example of flowmeter glass, features of which may possibly incorporated in an embodiment of the present invention may be found in U.S. Pat. No. 5,837,904 issued to Porter on Nov. 17, 1998 and entitled "Flowmeter tubes and method of installing them", all of this U.S. patent being hereby expressly incorporated by reference as if set forth in its entirety herein.

Some examples of ampules and methods of making ampules, features of which may possibly be incorporated in an embodiment of the present invention may be found in U.S. Pat. No. 3,375,948 issued to Creevy et al. on Apr. 2, 1968 and entitled "Vented enclosed ampoule and method of making it"; U.S. Pat. No. 3,923,487 issued to Lewis on Dec. 2, 1975 and entitled "Method of making glass ampuls in a non-contaminating manner"; U.S. Pat. No. 4,226,607 issued to Domken on Oct. 7, 1980 and entitled "Method for the manufacture of ampules from glass tubes"; and U.S. Pat. No. 4,516,998 issued to Ritt et al. on May 14, 1985 and entitled "Method of making tubular vials and ampules", all of these U.S. patents being hereby expressly incorporated by reference as if set forth in their entirety herein.

Examples of glass bottled and methods of making them, features of which may possibly be incorporated in an embodiment of the present invention may be found in U.S. Pat. No. 3,498,773 issued to Grubb et al. on Mar. 3, 1970 and entitled "Method of strengthening glass by ion exchange"; and U.S. Pat. No. 4,493,722 issued to Ono on Jan. 15, 1985 and entitled "Method of producing glass bottles", all of these U.S. patents being hereby expressly incorporated by reference as if set forth in their entirety herein.

The invention as described herein above in the context of the preferred embodiments is not to be taken as limited to all of the provided details thereof, since modifications and variations thereof may be made without departing from the spirit and scope of the invention.

At Least Partial Nomenclature
1) Gobbing end of feeder
2) Discharge ring
3) Tube drawing needle
3a) Needle shaft
3b) Needle head
3c) Stripping edge
4) Glass melt
5) Glass tube
6) Rollers
7) Gas atmosphere
8) Muffle
11) Glass capsule or body
12) Seal
13) Lead-in wires
14) Tungsten filament
15) Tungsten filament
30) Step—producing melt of molten glass
31) Step—shaping glass being drawn
32) Step—exposing a glass surface to oxygen atmosphere
33) Step—forming final product

What is claimed is:

1. In a process of making halogen lamp bulbs, discharge lamp bulbs, arc discharge lamp bulbs, neon lights, glass electrodes, analytical process glass, reagent container glass, glass test tubes, burets, pipettes, titration cylinders, glass reagent bottles, tubular glass parts in duct work, chemical equipment construction glass, flow meter glass, biotechnological process glass, display component glass, medical glass containers, ampules, bottles, injection bottles, cylinder ampules, or pharmaceutical product primary packaging glass, with a predetermined interior glass surface quality and purity, by hot forming, a method of making glass comprising the steps of:
    (a) producing a melt of molten glass;
    (b) passing molten glass along a tool to form a glass body from said melt of molten glass;
    (c) regulating a stream of gas to provide a sufficient stream of gas having a sufficient oxygen content along said glass body to minimize contamination of said glass body and thus to produce a glass surface of predetermined quality and predetermined purity;
    (d) continuing said regulating step (c) for a period of time sufficient to set and modify a surface condition of said glass body to a surface depth in the range of approximately 1000 to approximately 2000 nanometers.

2. The method according to claim 1, wherein said continuing step (d) comprises continuing said regulating step (c) for a period of time sufficient to set and modify the surface condition of said glass body to a surface depth of approximately 2000 nanometers.

3. The method according to claim 1, wherein said continuing step (d) comprises continuing said regulating step (c) for a period of time sufficient to set and modify the surface condition of said glass body to a surface depth of approximately 1000 nanometers.

4. The method according to claim 2 wherein hot forming according to step (b) comprises drawing said glass body from said melt of glass.

5. The method according to claim 4 wherein glass is drawn in tubular form from said melt of glass.

6. The method according to claim 5 which comprises:
    exposing, during drawing of glass in tubular form, the inner surface of glass in tubular form to said stream of gas.

7. The method according to claim 4 wherein glass is drawn in flat form from said melt of glass.

8. The method according to claim 2 comprising at least one of:
    maintaining said melt of molten glass at a viscosity with a value selected in the range of from $10^4$ dPas (10,000 decipascals) to $10^5$ dPas (100,000 decipascals); and
    said glass body is hot formed from a melt maintained at a temperature of more than 1000 degrees Celsius, in particular from a hot glass melt at a temperature of more than 1200 degrees Celsius.

9. The method according to claim 8 comprising producing a melt of glass according to step (a) from at least one member of the group comprising: borosilicate glass, neutral glass, and aluminosilicate glass.

10. The method according to claim 9 wherein said glass object is hot formed from a melt of glass having the following material composition, which materials are in ranges in weight percent on an oxide basis: silicon dioxide ($SiO_2$) from 40% to 75%; alumina ($Al_2O_3$) from 10% to 27%; boric oxide ($B_2O_3$) from 0% to 15%; magnesium oxide (MgO) from 0% to 10%; calcium oxide (CaO) from 0% to 12%; strontium oxide (SrO) from 0% to 12%; barium oxide (BaO) from 0% to 30%; zinc oxide (ZnO) from 0% to 10%; zirconium oxide ($ZrO_2$) from 0% to 5%; lithia (lithium oxide ($Li_2O$)+sodium oxide ($Na_2O$)+potassium oxide ($K_2O$)) from 0% to 7%; titania (titanium dioxide—$TiO_2$) from 0% to 5.5%; phosphorous oxide ($P_2O_5$) from 0% to 9.0%; and optional fining agents and coloring components in conventional quantities.

11. The method according to claim 9 wherein said glass object is hot formed from a glass melt having the following material composition, which materials are in ranges in weight percent on an oxide basis: silicon dioxide ($SiO_2$) from 60% to 80%; alumina ($Al_2O_3$) from 2% to 10%; boric oxide ($B_2O_3$) from 5% to 20%; magnesium oxide (MgO) from 0% to 8%; calcium oxide (CaO) from 0% to 12%; strontium oxide (SrO) from 0% to 8%; barium oxide (BaO) from 0% to 12%; zinc oxide (ZnO) from 0% to 10%; zirconium oxide ($ZrO_2$) from 0% to 5%; lithia (lithium oxide ($Li_2O$)+sodium oxide ($Na_2O$)+potassium oxide ($K_2O$)) from 2% to 12%; and optional fining agents and coloring components in conventional quantities.

12. The method according to claim 3 wherein hot forming according to step (b) comprises drawing said glass body from said melt of glass.

13. The method according to claim 12 wherein glass is drawn in tubular form from said melt of glass.

14. The method according to claim 13 which comprises:
    exposing, during drawing of glass in tubular form, the inner surface of glass in tubular form to said stream of gas.

15. The method according to claim 3 wherein glass is drawn in flat form from said melt of glass.

16. The method according to claim 3 comprising at least one of:

said melt of molten glass at a viscosity with a value selected in the range of from $10^4$ dPas (10,000 decipascals) to $10^5$ dPas (100,000 decipascals); and said glass body is hot formed from a melt maintained at a temperature of more than 1000 degrees Celsius, in particular from a hot glass melt at a temperature of more than 1200 degrees Celsius.

17. The method according to claim 16 comprising producing a melt of glass according to step (a) from at least one member of the group comprising: borosilicate glass, neutral glass, and aluminosilicate glass.

18. The method according to claim 17 wherein said glass object is hot formed from a melt of glass having the following material composition, which materials are in ranges in weight percent on an oxide basis: silicon dioxide ($SiO_2$) from 40% to 75%; alumina ($Al_2O_3$) from 10% to 27%; boric oxide ($B_2O_3$) from 0% to 15%; magnesium oxide (MgO) from 0% to 10%; calcium oxide (CaO) from 0% to 12%; strontium oxide (SrO) from 0% to 12%; barium oxide (BaO) from 0% to 30%; zinc oxide (ZnO) from 0% to 10%; zirconium oxide ($ZrO_2$) from 0% to 5%; lithia (lithium oxide ($Li_2O$)+sodium oxide ($Na_2O$)+potassium oxide ($K_2O$)) from 0% to 7%; titania (titanium dioxide—$TiO_2$) from 0% to 5.5%; phosphorous oxide ($P_2O_5$) from 0% to 9.0%; and optional fining agents and coloring components in conventional quantities.

19. The method according to claim 17 wherein said glass object is hot formed from a glass melt having the following material composition, which materials are in ranges in weight percent on an oxide basis: silicon dioxide ($SiO_2$) from 60% to 80%; alumina ($Al_2O_3$) from 2% to 10%; boric oxide ($B_2O_3$) from 5% to 20%; magnesium oxide (MgO) from 0% to 8%; calcium oxide (CaO) from 0% to 12%; strontium oxide (SrO) from 0% to 8%; barium oxide (BaO) from 0% to 12%; zinc oxide (ZnO) from 0% to 10%; zirconium oxide ($ZrO_2$) from 0% to 5%; lithia (lithium oxide ($Li_2O$)+sodium oxide ($Na_2O$)+potassium oxide ($K_2O$)) from 2% to 12%; and optional fining agents and coloring components in conventional quantities.

* * * * *

UNITED STATES PATENT AND TRADEMARK OFFICE
CERTIFICATE OF CORRECTION

PATENT NO. : 6,851,280 B2
DATED : February 8, 2005
INVENTOR(S) : Franz Ott, Otmar Becker and Karin Naumann It is certified that error appears in the above-identified patent and that said Letters Patent is hereby corrected as shown below:

Title page,
After Item [57], ABSTRACT, delete "19 Claims" and insert -- 20 Claims --.

Column 21,
Line 38, delete all of the claims, and replace with the following:
 -- 1. A method of making a halogen lamp by hot forming, said method comprising the steps of:
  (a) producing a melt of molten glass;
  (b) passing said molten glass along a tool to form a glass body having an interior and an exterior;
  (c) selecting a gas having an oxygen content selected to treat a portion of a glass material of said halogen lamp from an interior surface of said halogen lamp to a desired depth from said interior surface sufficient to decrease darkening by tungsten deposition on said interior surface of said treated portion of said glass material during operation of said halogen lamp;
  (d) providing a stream of said gas to contact a portion of said interior of said glass body;
  (e) inserting a filament in said glass body to produce said halogen lamp; and
  (f) injecting halogen gas into said glass body to produce said halogen lamp.

2. The method according to Claim 1, wherein said desired depth of step (c) is in the range of 150nm to 2000nm from said interior surface.

3. The method according to Claim 2, wherein at least one of (i) and (ii):
  (i) said step of passing said molten glass along a tool to form a glass body comprises passing said molten glass along a tool which is configured to withstand a temperature of more than 1000°C, and which is one of:
coated at least partly with platinum or a platinum-containing alloy; and
made of platinum or a platinum-containing alloy; and
  (ii) said step of providing a stream of said gas comprises providing a stream of said gas through a guide structure which is configured to withstand a temperature of more than 1000°C, and which is one of:
    coated at least partly with platinum or a platinum-containing alloy; and
    made of-platinum or a platinum-containing alloy.

4. The method according to Claim 3, wherein:
   said step of providing a stream of gas comprises providing a stream of gas having an oxygen content in the range of one of:
    up to 80 vol.%; and
    10 to 30 vol.%;
   said step of providing a stream of gas comprises providing a stream of gas containing at least one additional gas in addition to oxygen in a predetermined amount,

UNITED STATES PATENT AND TRADEMARK OFFICE
CERTIFICATE OF CORRECTION

| | | |
|---|---|---|
| PATENT NO. | : 6,851,280 B2 | |
| DATED | : February 8, 2005 | |
| INVENTOR(S) | : Franz Ott, Otmar Becker and Karin Naumann | |

It is certified that error appears in the above-identified patent and that said Letters Patent is hereby corrected as shown below:

Column 21 (cont'd),
said at least one additional gas being from the group consisting of nitrogen, inert gases, $CO_2$, $SO_2$, and $H_2O$; and
    at least one of (A), (B), (C), and (D):
        (A) said glass melt has a viscosity in the range of $10^4$ to $10^5$ dPas;
        (B) said glass melt has a temperature of more than one of: 1000°C and 1200°C;
        (C) said glass melt is one of: a borosilicate glass melt, a neutral glass melt, and an aluminosilicate glass melt;
        (D) said glass melt has one of the following compositions (Da) and (Db) (in wt.% on an oxide basis):

| (Da) | |
|---|---|
| $SiO_2$ | 40-75 |
| $Al_2O_3$ | 10-27 |
| $B_2O_3$ | 0-15 |
| MgO | 0-10 |
| CaO | 0-12 |
| SrO | 0-12 |
| BaO | 0-30 |
| ZnO | 0-10 |
| $ZrO_2$ | 0-5 |
| $Li_2O + Na_2O + K_2O$ | 0-7 |
| $TiO_2$ | 0-5.5 |
| $P_2O_5$ | 0-9.0 | as well as optional fining agents and coloring components in conventional quantities;

| (Db) | |
|---|---|
| $SiO_2$ | 60-80 |
| $Al_2O_3$ | 2-10 |
| $B_2O_3$ | 5-20 |
| MgO | 0-8 |
| CaO | 0-12 |
| SrO | 0-8 |
| BaO | 0-12 |
| ZnO | 0-10 |
| $ZrO_2$ | 0-5 |
| $Li_2O + Na_2O + K_2O$ | 2-12 | as well as optional fining agents and coloring components in conventional quantities.

5. The halogen lamp made according to the method of Claim 1.

UNITED STATES PATENT AND TRADEMARK OFFICE
CERTIFICATE OF CORRECTION

| | | |
|---|---|---|
| PATENT NO. | : 6,851,280 B2 | |
| DATED | : February 8, 2005 | |
| INVENTOR(S) | : Franz Ott, Otmar Becker and Karin Naumann | |

It is certified that error appears in the above-identified patent and that said Letters Patent is hereby corrected as shown below:

Column 21 (cont'd),
    6. A method of making a finished glass object, comprising one of: lamp bulbs, ampoules, bottles, vials, cylinder ampoules, pharmaceutical primary packaging, containers for medical and pharmaceutical products, reagent containers, test tubes burets, pipettes, titration cylinders, tubular parts for chemical equipment construction, and flat glass, by hot forming, said method
comprising the steps of:
    (a) producing a melt of molten glass;
    (b) forming a glass body;
    (c) selecting a gas having an oxygen content of one of: >0 to 20 vol.% and 22 to 100 vol.%, wherein said oxygen content is selected to decrease alkali ions, in a portion of a glass material of said finished glass object, from an exposed surface of said finished glass object to a desired depth of between 150nm to 2000nm from said exposed surface to decrease reactivity of said portion of said glass material to the desired depth from said exposed surface;
    (d) providing a stream of said gas to contact a portion of a surface of said glass body; and
    (e) finishing said glass body to form said finished glass object.

7. The method according to Claim 6, wherein at least one of (i) and (ii):
    (i) said step of forming a glass body comprises passing said molten glass along a tool which is configured to withstand a temperature of more than 1000°C, and which is one of:
        coated at least partly with platinum or a platinum-containing alloy; and
        made of platinum or a platinum-containing alloy; and
    (ii) said step of providing a stream of said gas comprises providing a stream of said gas through a guide structure which is configured to withstand a temperature of more than 1000°C, and which is one of:
        coated at least partly with platinum or a platinum-containing alloy; and
        made of platinum or a platinum-containing alloy.

8. The method according to Claim 7, wherein:
    said step of providing a stream of gas comprises providing a stream of gas having an oxygen content in the range of one of:
        22 to 80 vol.%; and
        10 to 20 vol.%;
    said step of providing a stream of gas comprises providing a stream of gas containing at least one additional gas in addition to oxygen in a predetermined amount, said at least one additional gas being from the group consisting of nitrogen, inert gases, $CO_2$, $SO_2$, and $H_2O$; and
        at least one of (A), (B), (C), and (D):

UNITED STATES PATENT AND TRADEMARK OFFICE
CERTIFICATE OF CORRECTION

PATENT NO. : 6,851,280 B2
DATED : February 8, 2005
INVENTOR(S) : Franz Ott, Otmar Becker and Karin Naumann It is certified that error appears in the above-identified patent and that said Letters Patent is hereby corrected as shown below:

Column 21 (cont'd),
    (A) said glass melt has a viscosity in the range of $10^4$ to $10^5$ dPas;
    (B) said glass melt has a temperature of more than one of: 1000°C and 1200°C;
    (C) said glass melt is one of: a borosilicate glass melt, a neutral glass melt, and an aluminosilicate glass melt;
    (D) said glass melt has one of the following compositions (Da) and (Db) (in wt.% on an oxide basis):

| (Da) | |
|---|---|
| $SiO_2$ | 40-75 |
| $Al_2O_3$ | 10-27 |
| $B_2O_3$ | 0-15 |
| MgO | 0-10 |
| CaO | 0-12 |
| SrO | 0-12 |
| BaO | 0-30 |
| ZnO | 0-10 |
| $ZrO_2$ | 0-5 |
| $Li_2O + Na_2O + K_2O$ | 0-7 |
| $TiO_2$ | 0-5.5 |
| $P_2O_5$ | 0-9.0 | as well as optional fining agents and coloring components in conventional quantities;

| (Db) | |
|---|---|
| $SiO_2$ | 60-80 |
| $Al_2O_3$ | 2-10 |
| $B_2O_3$ | 5-20 |
| MgO | 0-8 |
| CaO | 0-12 |
| SrO | 0-8 |
| BaO | 0-12 |
| ZnO | 0-10 |
| $ZrO_2$ | 0-5 |
| $Li_2O + Na_2O + K_2O$ | 2-12 | as well as optional fining agents and coloring components in conventional quantities.

9. The finished glass object made according to the method of Claim 6.

10. A method of making a finished glass object, comprising one of: lamp bulbs, ampoules, bottles, vials, cylinder ampoules, pharmaceutical primary packaging, containers for medical and pharmaceutical products, reagent containers, test tubes, burets, pipettes, titration cylinders, and tubular parts for chemical equipment construction, by hot forming, said method comprising the steps of:

UNITED STATES PATENT AND TRADEMARK OFFICE
CERTIFICATE OF CORRECTION

PATENT NO.    : 6,851,280 B2
DATED         : February 8, 2005
INVENTOR(S)   : Franz Ott, Otmar Becker and Karin Naumann It is certified that error appears in the above-identified patent and that said Letters Patent is hereby corrected as shown below:

Column 21 (cont'd),
  (a) producing a melt of molten glass;
  (b) forming a glass body;
  (c) selecting a gas having an oxygen content selected to decrease alkali ions, in a portion of a glass material of said finished glass object, from an exposed surface of said finished glass object to a desired depth from said exposed surface sufficient to decrease reactivity of said portion of said glass material to the desired depth from said exposed surface;
  (d) providing a stream of said gas to contact a portion of a surface of said glass body; and
  (e) finishing said glass body to form said finished glass object.

11. The method according to Claim 10, wherein at least one of (i) and (ii):
  (i) said step of forming a glass body comprises passing said molten glass along a tool which is configured to withstand a temperature of more than 1000°C, and which is one of:
    coated at least partly with platinum or a platinum-containing alloy; and
    made of platinum or a platinum containing alloy; and
  (ii) said step of providing a stream of said gas comprises providing a stream of said gas through a guide structure which is configured to withstand a temperature of more than 1000°C, and which is one of:
    coated at least partly with platinum or a platinum-containing alloy; and
    made of platinum or a platinum-containing alloy.

12. The method according to Claim 11, wherein said desired depth of step (c) is in the range of 150nm to 2000nm from said exposed surface.

13. The method according to Claim 12, wherein said step of providing a stream of gas comprises providing a stream of gas having an oxygen content in the range of one of:
    up to 80 vol.%; and
    10 to 30 vol.%.

14. The method according to Claim 13, wherein:
  said step of providing a stream of gas comprises providing a stream of gas containing at least one additional gas in addition to oxygen in a predetermined amount, said at least one additional gas being from the group consisting of nitrogen, inert gases, $CO_2$, $SO_2$, and $H_2O$; and
    wherein at least one of (A), (B), (C), and (D):
      (A) said glass melt has a viscosity in the range of $10^4$ to $10^5$ dPas;
      (B) said glass melt has a temperature of more than one of: 1000°C and 1200°C;

UNITED STATES PATENT AND TRADEMARK OFFICE
CERTIFICATE OF CORRECTION

PATENT NO. : 6,851,280 B2
DATED : February 8, 2005
INVENTOR(S) : Franz Ott, Otmar Becker and Karin Naumann It is certified that error appears in the above-identified patent and that said Letters Patent is hereby corrected as shown below:

Column 21 (cont'd),
    (C) said glass melt is one of: a borosilicate glass melt, a neutral glass melt, and an aluminosilicate glass melt;
    (D) said glass melt has one of thefollowing compositions (Da) and (Db) (in wt.% on an oxide basis):

| (Da) | |
|---|---|
| $SiO_2$ | 40-75 |
| $Al_2O_3$ | 10-27 |
| $B_2O_3$ | 0-15 |
| MgO | 0-10 |
| CaO | 0-12 |
| SrO | 0-12 |
| BaO | 0-30 |
| ZnO | 0-10 |
| $ZrO_2$ | 0-5 |
| $Li_2O + Na_2O + K_2O$ | 0-7 |
| $TiO_2$ | 0-5.5 |
| $P_2O_5$ | 0-9.0 | as well as optional fining agents and coloring components in conventional quantities;

| (Db) | |
|---|---|
| $SiO_2$ | 60-80 |
| $Al_2O_3$ | 2-10 |
| $B_2O_3$ | 5-20 |
| MgO | 0-8 |
| CaO | 0-12 |
| SrO | 0-8 |
| BaO | 0-12 |
| ZnO | 0-10 |
| $ZrO_2$ | 0-5 |
| $Li_2O + Na_2O + K_2O$ | 2-12 | as well as optional fining agents and coloring components in conventional quantities.

15. The glass object made according to the method of Claim 10.
    16. A method of making a finished glass object comprising flat glass, by hot forming, said method comprising the steps of:
        (a) producing a melt of molten glass;
        (b) forming a glass body;
        (c) selecting a gas consisting of at least one member of the group consisting of: oxygen, nitrogen, inert gases, $CO_2$, $SO_2$, and $H_2O$, and having an oxygen content selected to treat a portion of a glass material of said finished glass object, from an exposed surface of said finished glass object to a desired depth from said exposed surface sufficient to decrease reactivity of said portion of said glass material to the

UNITED STATES PATENT AND TRADEMARK OFFICE
CERTIFICATE OF CORRECTION

| | | |
|---|---|---|
| PATENT NO. | : 6,851,280 B2 | |
| DATED | : February 8, 2005 | |
| INVENTOR(S) | : Franz Ott, Otmar Becker and Karin Naumann | |

It is certified that error appears in the above-identified patent and that said Letters Patent is hereby corrected as shown below:

<u>Column 21 (cont'd)</u>,
desired depth from said exposed surface; and
    (d) providing a stream of said gas to contact a portion of a surface of said glass body.

17. The method according to Claim 16, wherein said desired depth of step (c) is in the range of 150nm to 2000nm from said exposed surface.

18. The method according to Claim 17, wherein at least one of (i) and (ii):
    (i) said step of forming a glass body comprises passing said molten glass along a tool which is configured to withstand a temperature of more than 1000°C, and which is one of:
        coated at least partly with platinum or a platinum-containing alloy; and
        made of platinum or a platinum-containing alloy; and
    (ii) said step of providing a stream of said gas comprises providing a stream of said gas through a guide structure which is configured to withstand a temperature of more than 1000°C, and which is one of:
        coated at least partly with platinum or a platinum-containing alloy; and
        made of platinum or a platinum-containing alloy.

19. The method according to Claim 18, wherein:
    said step of providing a stream of gas comprises providing a stream of gas having an oxygen content in the range of one of:
        up to 80 vol.%; and
        10 to 30 vol.%; and
at least one of (A), (B), (C), and (D):
        (A) said glass melt has a viscosity in the range of $10^4$ to $10^5$ dPas;
        (B) said glass melt has a temperature of more than one of: 1000°C and 1200°C;
        (C) said glass melt is one of: a borosilicate glass melt, a neutral glass melt, and an aluminosilicate glass melt;
        (D) said glass melt has one of the following compositions (Da) and (Db) (in wt.% on an oxide basis):

| | | |
|---|---|---|
| (Da) | $SiO_2$ | 40-75 |
| | $Al_2O_3$ | 10-27 |
| | $B_2O_3$ | 0-15 |
| | MgO | 0-10 |
| | CaO | 0-12 |
| | SrO | 0-12 |
| | BaO | 0-30 |
| | ZnO | 0-10 |
| | $ZrO_2$ | 0-5 |

UNITED STATES PATENT AND TRADEMARK OFFICE
CERTIFICATE OF CORRECTION

PATENT NO. : 6,851,280 B2
DATED : February 8, 2005
INVENTOR(S) : Franz Ott, Otmar Becker and Karin Naumann It is certified that error appears in the above-identified patent and that said Letters Patent is hereby corrected as shown below:

Column 21 (cont'd),

| | |
|---|---|
| $Li_2O + Na_2O + K_2O$ | 0-7 |
| $TiO_2$ | 0-5.5 |
| $P_2O_5$ | 0-9.0 | as well as optional fining agents and coloring components in conventional quantities;

| | |
|---|---|
| (Db) $SiO_2$ | 60-80 |
| $Al_2O_3$ | 2-10 |
| $B_2O_3$ | 5-20 |
| MgO | 0-8 |
| CaO | 0-12 |
| SrO | 0-8 |
| BaO | 0-12 |
| ZnO | 0-10 |
| $ZrO_2$ | 0-5 |
| $Li_2O + Na_2O + K_2O$ | 2-12 | as well as optional fining agents and coloring components in conventional quantities.

20. The glass object made according to the method of Claim 16. --.

Signed and Sealed this

Twentieth Day of December, 2005

JON W. DUDAS
*Director of the United States Patent and Trademark Office*